United States Patent [19]

Hasegawa

[11] 4,445,483
[45] May 1, 1984

[54] FUEL SUPPLY CONTROL SYSTEM FOR INTERNAL COMBUSTION ENGINES, HAVING A FUNCTION OF LEANING MIXTURE IN AN ENGINE LOW LOAD REGION

[75] Inventor: Shumpei Hasegawa, Niiza, Japan
[73] Assignee: Honda Motor Co., Ltd., Tokyo, Japan
[21] Appl. No.: 348,648
[22] Filed: Feb. 12, 1982

[30] Foreign Application Priority Data

Feb. 20, 1981 [JP] Japan .................................. 56-023994

[51] Int. Cl.³ ............................................. F02M 51/00
[52] U.S. Cl. .................................... 123/492; 123/480; 123/489
[58] Field of Search ............... 123/440, 478, 480, 482, 123/489, 492, 493

[56] References Cited

U.S. PATENT DOCUMENTS

| | | | |
|---|---|---|---|
| 4,048,964 | 9/1977 | Kissel | 123/482 |
| 4,129,105 | 12/1978 | Ito et al. | 123/440 |
| 4,158,347 | 6/1979 | Aoki | 123/489 |
| 4,169,440 | 10/1979 | Taplin et al. | 123/492 X |
| 4,170,201 | 10/1979 | Camp et al. | 123/489 |
| 4,261,315 | 4/1981 | Geiger et al. | 123/478 X |

Primary Examiner—Parshotam S. Lall
Assistant Examiner—W. R. Wolfe
Attorney, Agent, or Firm—Arthur L. Lessler

[57] ABSTRACT

A fuel supply control system for use with an internal combustion engine in which a fuel quantity adjusting means which controls the quantity of fuel being supplied to the engine is electrically controlled in response to operating condition of the engine to obtain a desired amount of fuel being supplied to the engine. The system includes means responsive to the outputs of an engine speed sensor and an intake pipe absolute pressure sensor to actuate the above fuel quantity adjusting means to lean a mixture being supplied to the engine when the actual engine speed is higher than a predetermined engine rpm and the actual intake pressure absolute pressure is lower than a predetermined absolute pressure. Preferably, the mixture leaning means may be also responsive to the output of an engine temperature sensor to cause leaning of the mixture when the actual engine temperature is higher than a predetermined engine temperature, simultaneously with fulfillment of the engine speed and absolute pressure requirements.

10 Claims, 56 Drawing Figures

| FIG. 1A | FIG. 1B |

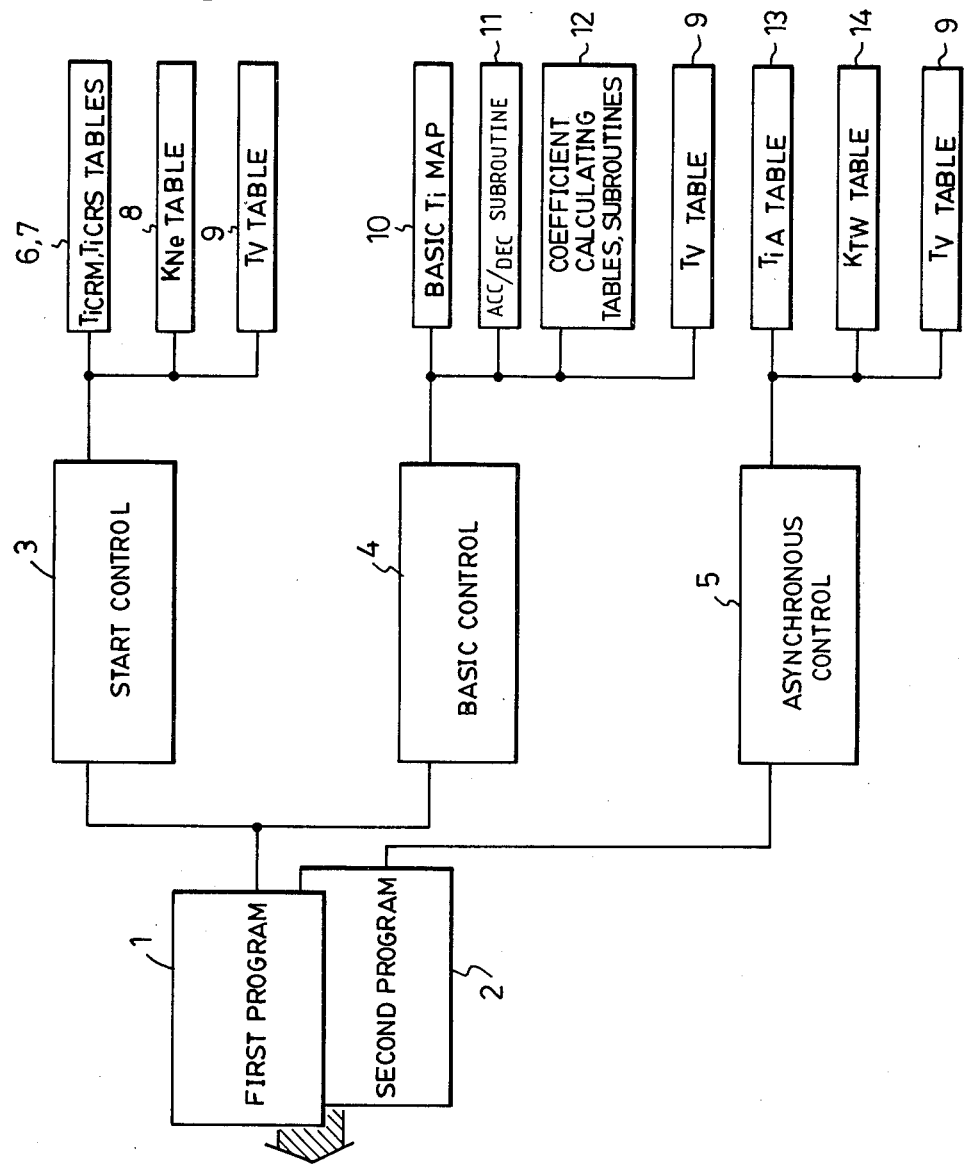

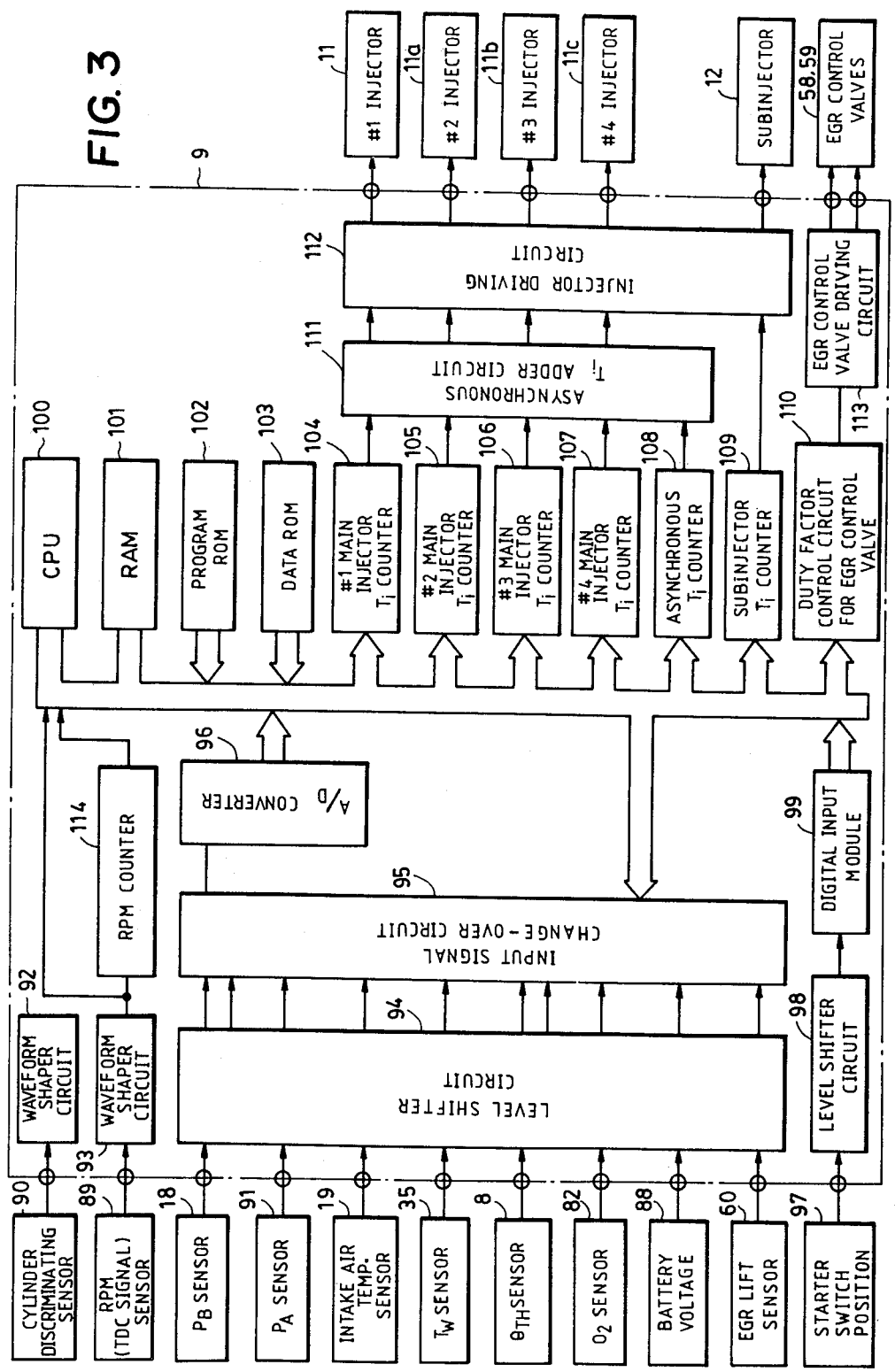

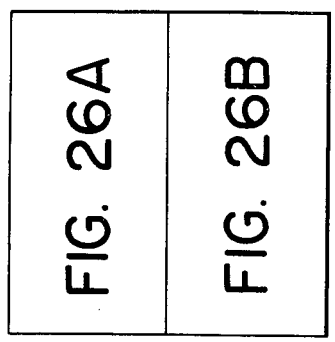
FIG. 26A
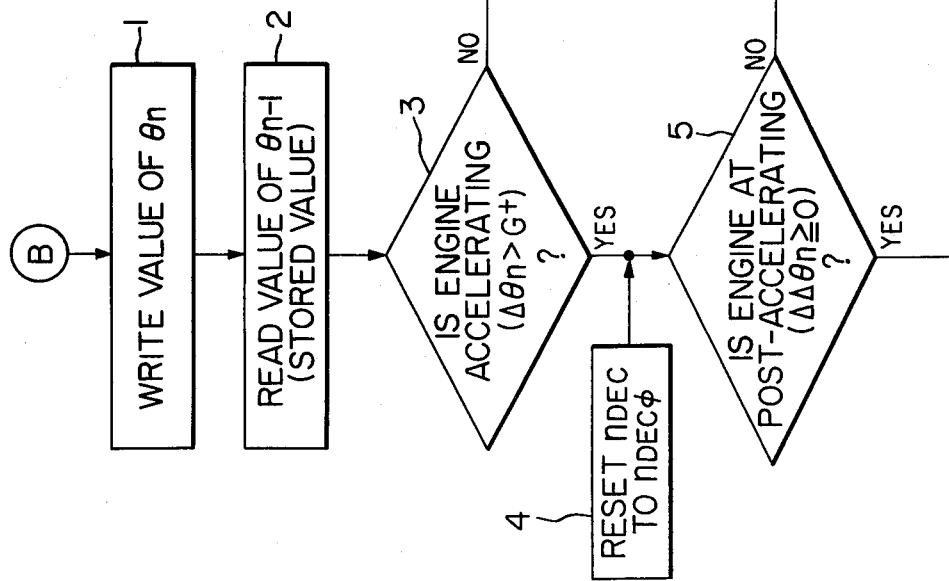

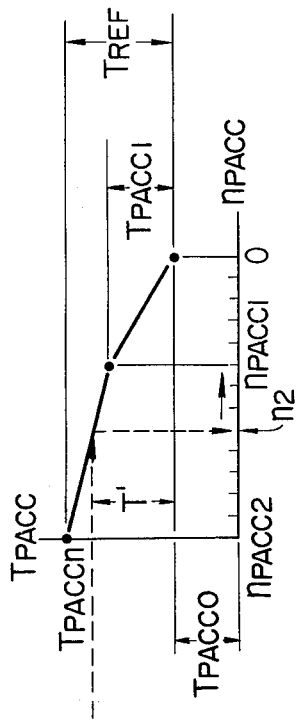
FIG. 28b
FIG. 28a
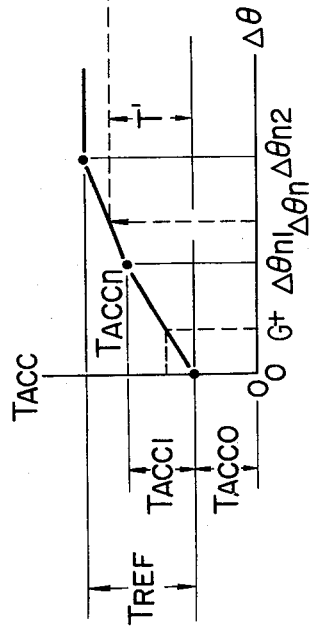
FIG. 34

FIG. 30a

| Ne \ PB | PB1 | --- | PBj | --- | PB16 |
|---|---|---|---|---|---|
| N1 | TM<sub>ij</sub> | | | | |
| ⋮ | | | | | |
| Ni | | | TM<sub>ij</sub> | | |
| ⋮ | | | | | |
| N16 | | | | | TM<sub>16,16</sub> |

FIG. 30b

| Ne \ PB | PB6 | --- | PBj | --- | PB15 |
|---|---|---|---|---|---|
| N1 | TEM<sub>1,6</sub> | | | | |
| ⋮ | | | | | |
| Ni | | | TEM<sub>ij</sub> | | |
| ⋮ | | | | | |
| N10 | | | | | TEM<sub>10,15</sub> |

FIG. 30c

| Ne \ PB | PB1 | --- | PBj | --- | PB16 |
|---|---|---|---|---|---|
| N1 | Ts<sub>1,1</sub> | | | | |
| ⋮ | | | | | |
| Ni | | | Ts<sub>ij</sub> | | |
| ⋮ | | | | | |
| N16 | | | | | Ts<sub>16,16</sub> |

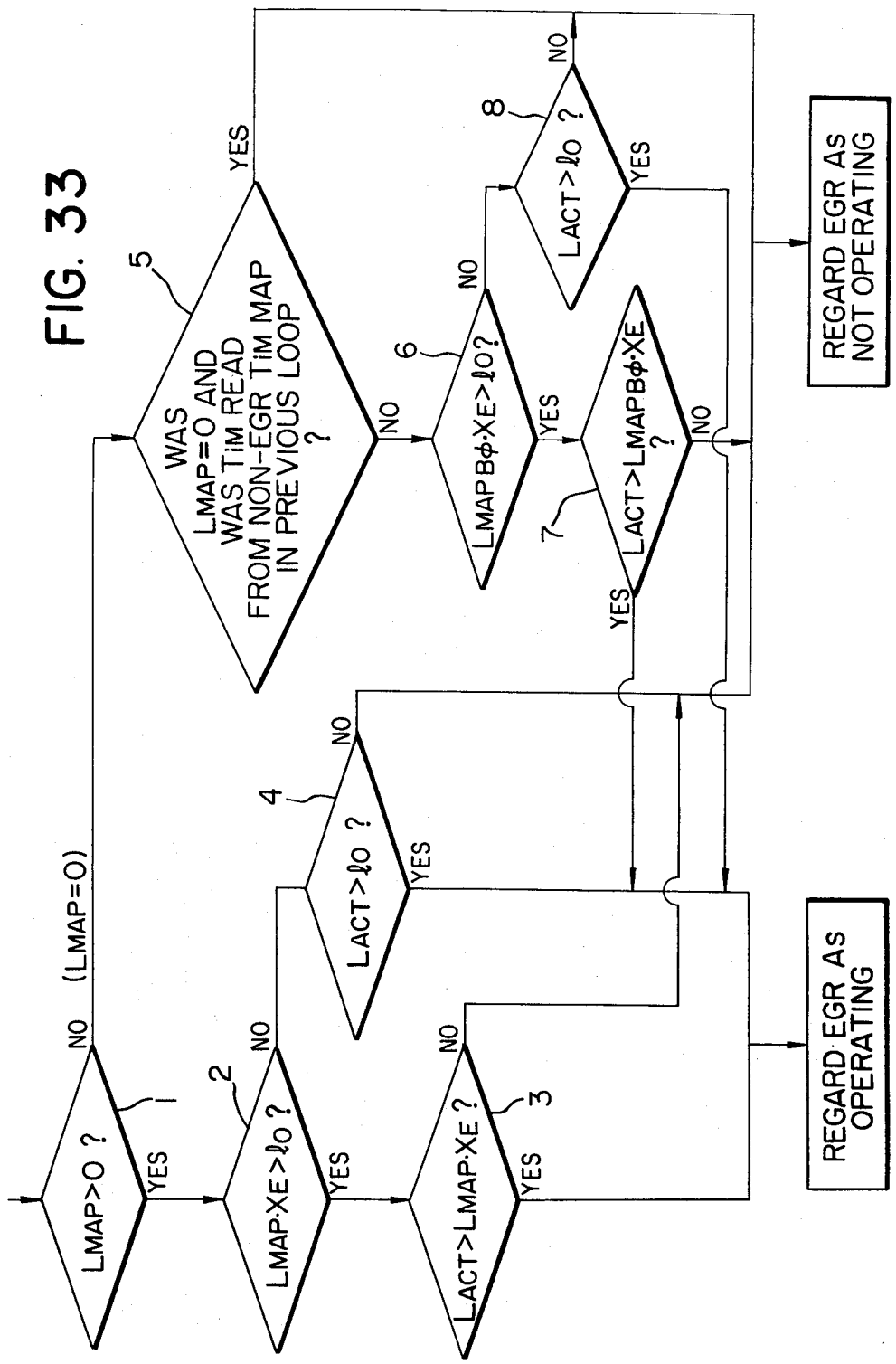

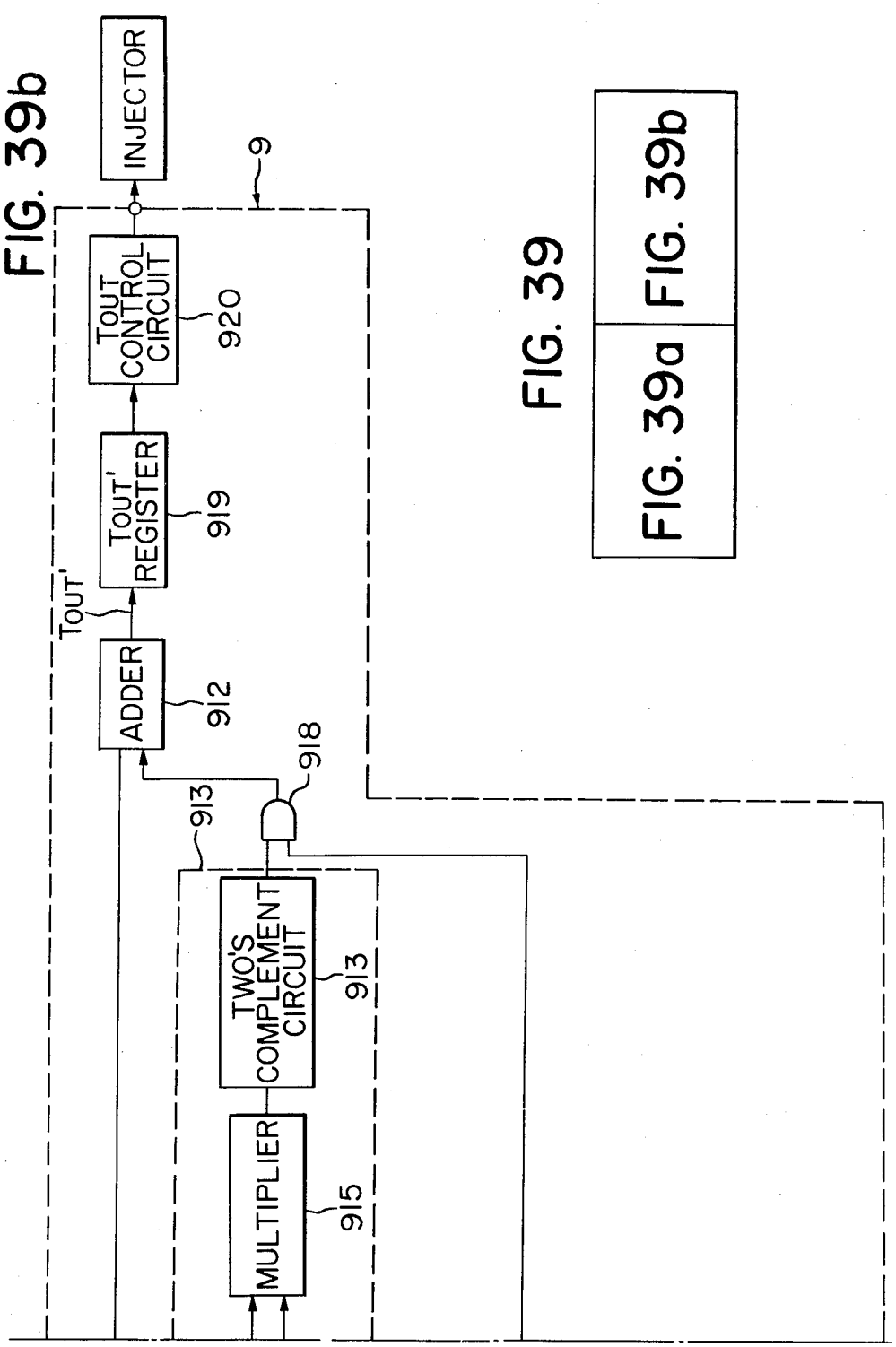

FUEL SUPPLY CONTROL SYSTEM FOR INTERNAL COMBUSTION ENGINES, HAVING A FUNCTION OF LEANING MIXTURE IN AN ENGINE LOW LOAD REGION

BACKGROUND OF THE INVENTION

This invention relates to a fuel supply control system for use with an internal combustion engine, and more particularly to such system in which a fuel quantity adjusting means, which supplies an air/fuel mixture to the engine, is controlled so as to lean the mixture when the engine is operating in a low load condition. The system is therefore enable to achieve curtailment of the fuel consumption without spoiling the driveability and emission characteristics of the engine.

A fuel supply control system is conventionally known which is adapted particularly for use with a gasoline engine and in which a fuel-injection type fuel quantity adjusting means for supplying fuel to the engine has its valve opening period electronically controlled so as to control the air/fuel ratio of an air/fuel mixture being supplied to the engine to a predetermined value.

As one of such fuel supply control systems there has been proposed e.g. by U.S. Pat. No. 3,483,851 a system which is adapted to determine the valve opening period of the fuel quantity adjusting means by first determining a basic value of the above valve opening period as a function of engine rpm and intake pipe absolute pressure and then adding to and/or multiplying same by constants and/or coefficients being functions of engine rpm, intake pipe absolute pressure, engine temperature, throttle valve opening, exhaust gas ingredient concentration (oxygen concentration), etc.

On the other hand, in these days there is a tendency for automobile fuel cost to gradually increase. To cope with this tendency, it has conventionally been employed to lean the mixture being supplied to the engine, that is, set the air fuel ratio of the mixture at a higher value than the stoichiometric value for reduction of the fuel consumption.

While the three-way catalyst, which is conventionally used for purifying unburned hydrocarbons, carbon monoxide and nitrous oxides in the exhaust gases emitted from an engine, shows the best conversion efficiency of such ingredients when the engine is operating in an air/fuel ratio near the stoichiometric air/fuel ratio, it is known that leaning of the mixture reduces the hydrocarbons and carbon monoxide being emitted from the engine and further leaning of the mixture also reduces the nitrous oxides being emitted from the engine. Therefore, the emission characteristics would not be spoiled by leaning the mixture.

However, since leaning of the mixture causes a drop in the output of the engine, the mixture should not be leaned when the engine is operating in a large torque-required condition such as rapid acceleration and wide-open-throttle, to avoid poor driveability. In such large torque-required conditions, the mixture should be enriched so as to obtain a required engine output. For this reason, conventionally, leaning of the mixture is effected when the engine is operating in a low load and steady condition where large torque is not required, such as a cruising condition.

Engine idle operation falls in the category of the low load steady condition of the engine, in which leaning of the mixture is also effected in some engines. However, the operating region of the engine to which the present invention is directed is a mixture leaning region corresponding to higher engine rpm's than usual idling rpm. If leaning of the mixture is continuously carried out when the engine is rapidly accelerated from its idling state, required acceleration performance cannot be obtained, resulting in deteriorated driveability. That is, the mixture leaning operation should be interrupted when the engine is rapidly accelerated into the above higher engine rpm mixture leaning region from its idling state.

For the same reason as above, the mixture leaning region should be discriminated against other large torque-required engine operating regions so that in the latter operating regions the mixture is not leaned.

Further, the engine temperature should also be taken into consideration for effecting the mixture leaning operation. If the mixture is in a lean state when the engine temperature is low, the phenomenon called misfire will occur that no firing takes place in the engine cylinders.

As mentioned above, leaning of the mixture should be made when the engine is operating in a low load condition. Generally, detection of the low load condition of the engine is made by detecting pressure in the intake pipe of the engine. In this case, if the pressure in the intake pipe is detected by means of a gauge pressure sensor, the detected pressure value varies with changes in the ambient atmospheric pressure, which can bring about disadvantages such as the one that in high altitudes leaning of the mixture is not effected even when the engine is operating in such a condition as requires leaning of the mixture. Therefore, to determine the mixture leaning condition with accuracy, the intake pipe pressure needs to be detected by means of a sensor operable without being influenced by ambient atmospheric pressure, i.e., an absolute pressure sensor.

The above-mentioned various requirements must be taken into consideration to carry out leaning of the mixture.

OBJECTS AND SUMMARY OF THE INVENTION

It is an object of the invention to provide a fuel supply control system for use with an internal combustion engine, which is adapted to determine an operating region of the engine for carrying out leaning of the mixture on the basis of engine rpm and intake pipe absolute pressure so as to discriminate the same operating region against the other operating regions of the engine, thereby achieving curtailment of the fuel consumption without spoilage of the driveability and emission characteristics of the engine.

It is a further object of the invention to provide a fuel supply control system for use with an internal combustion engine, which is capable of determining a predetermined low load condition of the engine for carrying out leaning of the mixture, with accuracy and in a stable manner to thereby improve the operation stability of the engine.

The fuel supply control system according to the invention is provided with fuel quantity adjusting means for controlling the quantity of fuel being supplied to the engine, which is electrically controlled in response to operating condition of the engine to obtain a desired quantity of fuel being supplied to the engine. The system further includes a sensor for detecting the rotational speed or rpm of the engine, a sensor for detecting absolute pressure in the intake pipe of the engine, which is operable independently of changes in the atmospheric pressure surrounding the engine, and means responsive to outputs of the above two sensors to cause leaning of an air/fuel mixture being supplied to the engine. The mixture leaning means is adapted to cause the fuel quantity adjusting means to lean the mixture when the engine is operating in a predetermined low load condition where the actual rotational speed of the engine detected by the engine rotational speed sensor is higher than a predetermined rotational speed and the actual absolute pressure in the intake pipe detected by the absolute pressure sensor is lower than a predetermined absolute pressure.

Preferably, the fuel supply control system may also include a sensor for detecting the temperature of the engine, wherein the mixture leaning means is adapted to carry out the mixture leaning operation when the actual engine temperature detected by the engine temperature sensor is higher than a predetermined engine temperature, at the same time of fulfillment of the above engine rotational speed and intake pipe absolute pressure requirements.

The fuel supply control system according to the invention may include an exhaust gas sensor for detecting the concentration of an ingredient (oxygen) in the exhaust gases, and feedback control means operatively connecting the exhaust gas sensor to the fuel quantity adjusting means and operable in response to an output of the exhaust gas sensor to electrically control the fuel quantity adjusting means to control the air/fuel ratio of the mixture to a predetermined value. The feedback control is interrupted during the mixture leaning operation.

Preferably, the aforementioned predetermined engine rotational speed and predetermined absolute pressure are each set at different values between the time when the mixture leaning operation is initiated and the time when the mixture leaning operation is terminated, imparting a hysteresis characteristic to the mixture leaning operation.

The fuel quantity adjusting means may be formed of fuel injection valve means adapted to control the quantity of fuel being supplied to the engine through changes in its fuel injection period. The basic fuel injection period of the fuel injection valve means is determined by engine rpm and intake pipe absolute pressure. The mixture leaning means is adapted to generate a correction coefficient for shortening the basic fuel injection period during the mixture leaning operation to perform leaning of the mixture.

The above and other objects, features and advantages of the invention will be more apparent from the ensuing detailed description taken in connection with the accompanying drawings in which:

BRIEF DESCRIPTION OF THE DRAWINGS

FIG. 2 is a block diagram illustrating a whole program for control of the valve-opening periods TOUTM and TOUTS of the main injectors and the subinjector, which is incorporated in the electronic control unit (ECU) in FIG. 1;

FIG. 3 is a block diagram illustrating the whole circuit configuration of ECU;

FIGS. 26, 26A and 26B are a flow chart showing a subroutine for calculation of acceleration and postacceleration fuel increasing constants TACC and TPACC and deceleration fuel decreasing constant TOEC, all being applicable during TDC signal-synchronized fuel supply control operation;

FIG. 28a is a view showing a table of the relationship between throttle valve opening variation $\Delta\theta n$ and acceleration fuel increasing constant TACC;

FIG. 28b is a view showing a table of the relationship between the number of TDC signal pulses NPACC counted after fuel cut operation and postacceleration fuel increasing constant TPACC;

FIG. 30a is a view showing a TiM map applicable during non-EGR operation;

FIG. 30b is a view showing a TiM map applicable during EGR operation;

FIG. 30c is a view showing a TiS map;

FIG. 31a is a graph for calculation of values intervenient between the TiM values in the map of FIG. 30a;

FIG. 33 is a flow chart showing an EGR operation determining program;

FIG. 34 is a view showing a map of lift command value LMAP;

FIGS. 39, 39a and 39b are a block diagram showing a "lean stoich." operation control section of the internal arrangement of ECU in FIG. 1;

DETAILED DESCRIPTION

Figures 1, 1A:
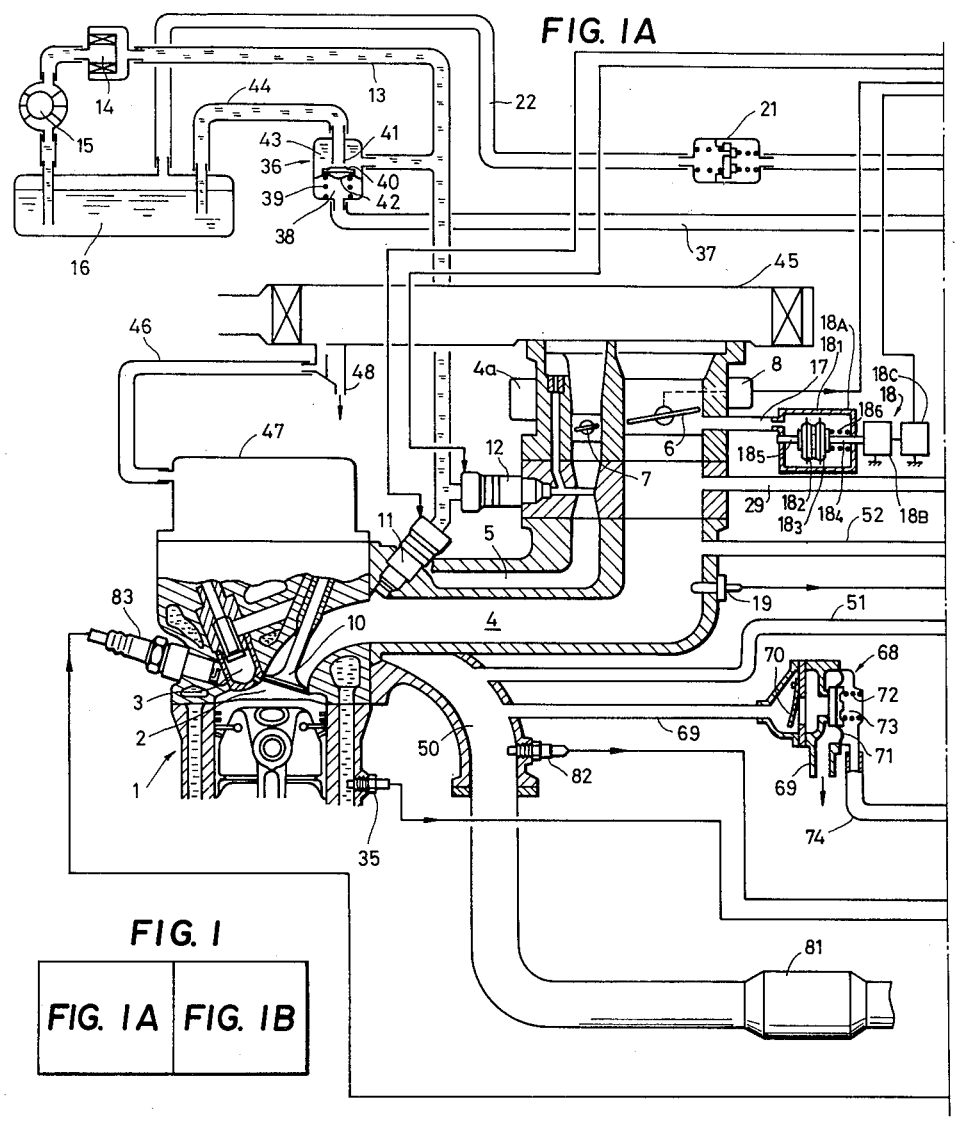
FIGS. 1, 1A and 1B are a schematic view illustrating the whole arrangement of a fuel supply control system according to one embodiment of the invention.
Figure 1B:
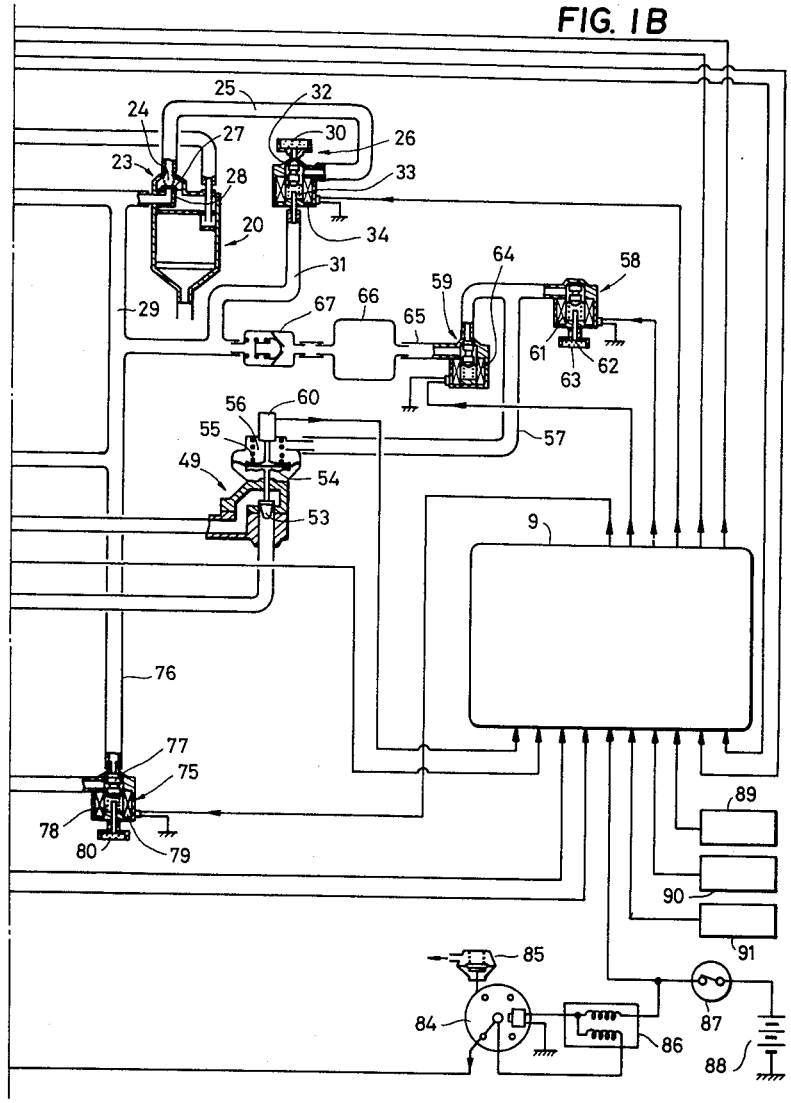

Referring first to FIG. 1, there is illustrated a schematic view of a fuel supply control system according to one embodiment of the invention. Reference numeral 1 designates an internal combustion engine which may be a four-cylinder type, for instance. This engine has main combustion chambers 2 (which may be four, only one of which is shown) and a sub combustion chamber 3 communicating with the main chambers. A main intake pipe 4 communicates with each main combustion chamber 2, and a sub intake pipe 5 with the sub combustion chamber 3, respectively. A main throttle valve 6 and a sub throttle valve 7 are arranged, respectively, in the main intake pipe 4 and the sub intake pipe 5 for synchronous operation. A throttle valve opening sensor 8 is connected to the main throttle valve 6 for detecting its valve opening to convert same into an electrical signal which is supplied to an electronic control unit (hereinafter called "ECU") 9.

A main injector 11 forming a fuel injection device is provided for each engine cylinder and arranged in the main intake pipe 4 at a location slightly upstream of an intake valve 10, while a single subinjector 12 is provided for common use with all the engine cylinders and arranged in the sub intake pipe 5 at a location slightly downstream of the sub throttle valve 7. The main injectors 11 and the subinjector 12 are connected to a fuel tank 16 by way of a conduit 13, a fuel filter 14 and a fuel pump 15. These injectors 11, 12 are electrically connected to ECU 9 so as to have their valve opening periods or fuel injection quantities controlled by signals supplied from ECU 9.

On the other hand, an absolute pressure sensor 18 communicates with the interior of the main intake pipe 4 via a conduit 17 opening in the same pipe 4 at a location immediately downstream of the main throttle valve 6. The sensor 18 is arranged to supply an electrical signal indicative of actual absolute pressure to ECU 9. This absolute pressure sensor 18 is adapted to detect pressure in the intake pipe 4, that is, absolute pressure, without being affected by atmospheric pressure, and comprises a sensor body 18A, a differential transformer 18B and a rectifier circuit 18C. In the sensor body 18A, two bellows $18_2$, $18_3$ having vacuum interiors are arranged in a stacked manner within a hermetically sealed casing $18_1$ which has its interior communicating solely with the interior of the intake pipe 4 through the conduit 17. The bellows $18_2$, $18_3$ are supported at a central portion of the casing $18_1$ by an output shaft $18_4$ and a fixing bolt $18_5$, both secured to the bellows. A restituting spring $18_6$ is fitted on the output shaft $18_4$ and urges the bellows. The output shaft $18_4$ is coupled to the movable iron core, not shown, of the differential transformer 18B which has a conventional construction. The output of the differential transformer 18B is electrically connected to the rectifier circuit 18C which in turn has its output electrically connected to ECU 9. The bellows $18_2$, $18_3$ assume volumes corresponding to the pressure or absolute pressure in the intake pipe 4 to determine the position of the output shaft $18_4$. The position of the output shaft 18 in turn determines the position of the movable iron core of the differential transformer 18B so that alternating current voltage corresponding to the position of the iron core is generated in the induction coils, not shown, of the transformer 18B. The alternating current voltage generated is converted into a corresponding direct current voltage by the rectifier circuit 18C, which is supplied to ECU 9. A change in the intake pipe pressure causes expansion or contraction of the bellows $18^2$, $18^3$ to displace the output shaft $18_4$ and accordingly the movable iron core to vary the alternating current voltage to be generated and accordingly the output direct current voltage.

The illustrated absolute pressure sensor is not limitative. Other type pressure sensors may be applied to the invention so long as they can detect the pressure in the intake pipe 4 without being affected by atmospheric pressure. Particularly, semiconductor pressure sensors which utilize piezo resistance effect may be advantageously used.

Located downstream of the pressure intake conduit 17 of the absolute pressure sensor 18 is an intake air temperature sensor 19 which is also arranged to supply an electrical signal indicative of actual intake air temperature to ECU 9.

Reference numeral 20 designates a canister which communicates with the upper portion of the fuel tank 16 via a conduit 22 having a two-way valve 21 arranged thereacross so that evaporated fuel in the fuel tank 16 is introduced into the canister 20. The canister 20 is provided with a negative pressure-actuated valve 23 which has a pressure chamber 24 communicating with a purge cut valve 26 via a conduit 25. The valve 23 also has an open valve seat 28, which is disposed to be closed by a diaphragm 27 forming a valve body, communicates with the main intake pipe 4 at a zone downstream of the main throttle valve 6 via a conduit 29.

The above purge cut valve 26 is formed of an air intake port 30 provided therein with a filter communicating with the atmosphere, a valve body 32 disposed to interrupt communication of a conduit 31 connected to the conduit 29 with the conduit 25, a spring 33 urging the valve body 32 in a valve opening direction to permit the conduit 31 to communicate with the conduit 25, and a solonoid 34 disposed for energization by a control signal outputted from ECU 9. With this arrangement, negative pressure produced in the main intake pipe 4 at a zone downstream of the main throttle valve 6 during rotation of the engine is introduced into the pressure chamber 24 through the conduits 25, 31 when the purge cut valve 26 is deenergized, so that the diaphragm 27 is displaced against the force of a spring in the chamber 24 to open the valve 23 to allow absorbed fuel in the canister 20 to be purged into the main intake pipe 4 through the valve 23 and the conduit 29.

At the start of the engine, the above purge cut valve 26 operates to establish communication of the conduit 25 with the atmosphere via the air intake port 30 to cause closing of the valve 23 for temporary interruption of the supply of absorbed fuel from the canister 20 to the main intake pipe 4 (purge cut). The purge cut is effected for the following reason: At the start of the engine an increased amount of fuel is injected into the main intake pipe 4 due to a low engine cooling water temperature, etc. so that the mixture in the main intake pipe 4 is very rich. If on this occasion supply of fuel from the canister 20 to the main intake pipe 4 is effected, disadvantageously the mixture becomes too rich. Therefore, the purge cut valve 26 is arranged to be actuated on this occasion to temporarily interrupt the supply of fuel from the canister 20 to the main intake pipe 4. The supply of fuel from the canister 20 to the main intake pipe 4 is initiated after warming-up of the engine has been completed to render inoperative a fast idle device 4a which is adapted to open the main throttle valve 6 at and after the start of the engine, and when the engine temperature exceeds a predetermined value. This engine temperature is detected in terms of engine cooling water temperature by means of an engine water temperature sensor 35 formed of a thermistor or the like and inserted in the peripheral wall of an engine cylinder having its interior filled with cooling water, an detected output signal of which is supplied to ECU 9. ECU 9 compares a value of this detected output signal with a predetermined value (e.g. 70° C.) stored in ECU 9, and when the former exceeds the latter, ECU 9 interrupts energization of the purge cut valve 26 so far continued, to establish communication of the conduit 25 with the conduit 31 for initiation of the supply of absorbed fuel from the canister 20 to the main intake pipe 4 through the valve 23 and the conduit 29.

Reference numeral 36 designates a pressure-regulating valve for regulating the injection fuel pressure. In this valve, a pressure chamber 38 is partitioned by a diaphragm 42 from a valve chamber 43, the former being connected to a conduit 37 communicating with the conduit 29 and the latter communicating with the conduit 13. The diaphragm 42 is urged by a spring 39 to push a valve body 40 secured thereon against a tubular valve seat 41 which is connected to the fuel tank 16 through a conduit 44. This pressure-regulating valve 36 operates such that when the fuel pressure in the valve chamber 43 acting upon the diaphragm 42 exceeds the sum of the absolute pressure in the main intake pipe 4 and the urging force of the spring 39, the valve body 40 is moved away from the valve seat 41 to open the valve so that part of the fuel being injected is returned to the fuel tank 16 through the conduit 44 to maintain constant the difference between the pressure of fuel being injected and the absolute pressure in the main intake pipe 4.

Reference numeral 45 denotes an air cleaner connected to the main and the sub intake pipes 4, 5. The air cleaner 45 communicates with cylinder heads 47 by way of conduits 46 forming blow-bye gas return means and also communicating with the main intake pipe 4 through an oil separator 48.

Reference numeral 49 designates an exhaust gas recirculation valve which is a negative pressure-actuated type and formed of a valve body 53 disposed to interrupt communication of a conduit 51 leading to the exhaust pipe 50 of the engine 1 with a conduit 52 leading to the main intake pipe 4, a diaphragm 54 carrying the valve body 53, and a spring 55 urging the diaphragm 54 in the valve closing direction. A negative pressure chamber 56 is defined by the diaphragm 54, which communicates with a pair of EGR control valves 58, 59 by way of a conduit 57. A lift sensor 60 is mounted on an end of the valve body 53 of the exhaust gas recirculation valve 49, which is adapted to convert the operating position or lift of the valve body 53 into an electrical signal and supply the same signal to ECU 9.

The EGR control valve 58 is a normally open type and operates such that its solenoid 61 is deenergized by an electrical signal supplied from ECU 9 to allow the conduit 57 to communicate with the atmosphere through its air intake port 63 provided with a filter 62 for introduction of atmospheric pressure into the negative pressure chamber 56 of the exhaust gas recirculation valve 49. The other EGR control valve 59 is a normally closed type and operates such that its solenoid 64 is energized by an electrical signal supplied from ECU 9 to allow the conduit 57 to communicate with an accumulator tank 66 through a conduit 65. The accumulator tank 66 stores absolute pressure supplied from the main intake pipe 4 through the conduit 29 and a check valve 67. When the EGR control valve 59 is opened, the stored absolute pressure is introduced into the negative pressure chamber 56 of the exhaust gas recirculation valve 49.

The two EGR control valves 58, 59 are actuated concurrently or separately in response to control signals outputted from ECU 9 to control the valve opening action and operating speed of the valve body 53 of the exhaust gas recirculation valve 49.

Reference numeral 68 represents a secondary air supply valve. This valve is comprised of a reed 70 diposed to close a conduit 69, a diaphragm 71 arranged upstream of the reed 70 and disposed to close the same conduit 69, and a spring 72 disposed to urge the diaphragm 71 in its closing direction. The conduit 69 communicates with the air cleaner 45 at its one end for introduction of atmospheric air. A negative pressure chamber 73 is defined by the diaphragm 71 and communicates with a solenoid valve 75 by way of a conduit 74. The solenoid valve 75 is formed of a valve body 77 disposed to interrupt communication between a conduit 74 and a conduit 76 leading to the conduit 29, a spring 78 urging the valve body 77 in its closing direction, a solenoid 79 arranged to be energized by a control signal supplied from ECU 9, and an air intake port 80 disposed to communicate with the conduit 74 when the valve is closed. During operation, the valve 75 allows negative pressure produced in the main intake pipe 4 at a zone downstream of the main throttle valve 6 to be introduced into the negative pressure chamber 73 of the secondary air supply valve 68 through itself. This negative pressure causes retraction of the diaphragm 71 away from its tubular valve seat so that atmospheric air or secondary air is introduced into the valve 68. When negative pressure occurs in the exhaust pipe 50 on this occasion, the reed 70 is urgedly opened by the atmospheric air to allow introduction of same into the exhaust pipe 50. This introduction of secondary air causes a three-way catalyst, which is arranged in the exhaust pipe 50 at a downstream portion, to operate under an oxidizing atmosphere so that HC and CO ingredients in the exhaust gases are burnt under the oxidizing atmosphere for good purification thereof.

An $O_2$ sensor 82 forming an exhaust gas sensor is embedded in the inner wall of the exhaust pipe 50 at a location slightly upstream of the three-way catalyst 81 but slightly downstream of the end of the conduit 69 opening in the exhaust pipe 50, for detecting the concentration of oxygen present in the exhaust gases. The sensor 82 is electrically connected to ECU 9 to supply its output signal thereto. If the introduction of secondary air into the exhaust pipe 50 is carried out by the secondary air supply valve 68 during air/fuel ratio feedback control operation which is responsive to the output signal of the $O_2$ sensor 82, hereinafter referred to, the output signal of the $O_2$ sensor 82, which is located downstream of the pipe 69 as noted above, does not represent proper values for controlling the air/fuel ratio of mixture to a desired value. To avoid this, the secondary air supply valve 68 is kept inoperative during the air/fuel ratio feedback control operation, by means of the solenoid valve 75 which is controlled by a control signal outputted from ECU 9. That is, the valve 68 is allowed to operate only when a particular open loop control condition is fulfilled.

Incidentally, in FIG. 1, reference numeral 83 designates an ignition plug, 84 a distributor, 85 a vacuum advance, 86 an ignition coil, 87 an ignition switch, and 88 a battery, respectively. Further, reference numeral 89 indicates an engine rpm sensor adapted to generate one pulse at a particular crank angle each time the engine crank shaft rotates through 180 degrees, i.e. upon generation of each pulse of the TDC signal, 90 a cylinder-discriminating sensor adapted to generate one pulse at a particular crank angle of a first engine cylinder, and 91 an atmospheric pressure sensor for converting actual atmospheric pressure into an electrical signal, respectively.

Next, the fuel quantity control action of the fuel supply control system of the invention arranged as above will now be described in detail with reference to FIG. 1 referred to hereinabove and FIGS. 2 through 41.

Referring first to FIG. 2, there is illustrated a block diagram showing the whole program for air/fuel ratio control, i.e. control of valve opening periods TOUTM, TOUTS of the main injectors and the subinjector, which is executed by ECU 9. The program comprises a first program 1 and a second program 2. The first program 1 is used for fuel quantity control in synchronism with the TDC signal, hereinafter merely called "Synchronous control" unless otherwise specified, and comprises a start control subroutine 3 and a basic control subroutine 4, while the second program 2 comprises an asynchronous control subroutine which is carried out in asynchronism with or independently of the TDC signal.

In the start control subroutine, the valve opening periods TOUTM and TOUTS are determined by the following basic equations:

$$TOUTM = TiCRM \times KNe + (TV + \Delta TV) \qquad (1)$$

$$TOUTS = TiCRS \times KNe + TV \qquad (2)$$

where TiCRM, TiCRS represent basic values of the valve opening periods for the main injectors and the subinjector, respectively, which are determined from a TiCRM table 6 and a TiCRS table 7, respectively, KNe represents a correction coefficient applicable at the start of the engine, which is variable as a function of engine rpm Ne and determined from a KNe table 8, and TV represents a constant for increasing and decreasing in response to changes in the output voltage of the battery, which is determined from a TV table 9. ΔTV is added to TV applicable to the main injectors as distinct from TV applicable to the subinjector, because the main injectors are structurally different from the subinjector and therefore have different operating characteristics.

The basic equations for determining the values of TOUTM and TOUTS applicable to the basic control subroutine 4 are as follows:

$$TOUTM = (TiM - TDEC) \times (KTA \times KTW \times KAFC \times KPA \times KAST \times KWOT \times KO_2 \times KLS) + TACC \times (KTA \times KTWT \times KAFC) + (TV + \Delta TV) \quad (3)$$

$$TOUTS = (TiS - TDEC) \times (KTA \times KTW \times KAST) + TV \quad (4)$$

where TiM, TiS represent basic values of the valve opening periods for the main injectors and the subinjector, respectively, and are determined from a basic Ti map 10, and TDEC, TACC represent constants applicable, respectively, at engine decceleration and at engine acceleration and are determined by acceleration and decceleration subroutines 11. The coefficients KTA, KTW, etc. are determined by their respective tables and/or subroutines 12. KTA is an intake air temperature-dependent correction coefficient and is determined from a table as a function of actual intake air temperature, KTW a fuel increasing coefficient which is determined from a table as a function of actual engine cooling water temperature TW, KAFC a fuel increasing coefficient applicable after fuel cut operation and determined by a subroutine, KPA an atmospheric pressure-dependent correction coefficient determined from a table as a function of actual atmospheric pressure, and KAST a fuel increasing coefficient applicable after the start of the engine and determined by a subroutine. KWOT is a coefficient for enriching the air/fuel mixture, which is applicable at wide-open-throttle and has a constant value, $KO_2$ an "$O_2$ feedback control" correction coefficient determined by a subroutine as a function of actual oxygen concentration in the exhaust gases, and KLS a mixture-leaning coefficient applicable at "lean stoich." operation and having a constant value. The term "stoich." is an abbreviation of a word "stoichiometric" and means a stoichiometric or theoretical air/fuel ratio of the mixture. TACC is a fuel increasing constant applicable at engine acceleration and determined by a subroutine and from a table.

On the other hand, the valve opening period TMA for the main injectors which is applicable in asynchronism with the TDC signal is determined by the following equation:

$$TMA = TiA \times KTWT + (TV + \Delta TV) \quad (5)$$

where TiA represents a TDC signal-asynchronous fuel increasing basic value applicable at engine acceleration and in asynchronism with the TDC signal. This TiA value is determined from a TiA table 13. KTWT is defined as a fuel increasing coefficient applicable at and after TDC signal-synchronous acceleration control as well as at TDC signal-asynchronous acceleration control, and is calculated from a value of the aforementioned water temperature-dependent fuel increasing coefficient KTW obtained from the table 14.

FIG. 3 is a block diagram of the circuit arrangement in ECU 9. An output signal of the cylinder-discriminating sensor 90 is applied to a waveform shaper circuit 92, while a TDC signal outputted from the Ne sensor 89 is applied to a CPU 100 and an rpm counter 114 through another waveform shaper circuit 93. Output signals of the absolute pressure sensor 18, the atmospheric pressure sensor 91, the intake air temperature sensor 19, the engine cooling water temperature sensor 35, the throttle valve opening sensor 8 and the $O_2$ sensor 82, a signal indicative of the output voltage of the battery 88 and an output signal of the lift sensor 60 for the exhaust gas recirculation valve are all applied to a level shifter circuit 94 to be changed into respective voltage levels suited for processing within ECU 9. An input signal change-over circuit 95 operates in response to a command from CPU 100 to selectively allow required ones of the above input signals to an arithmetic unit hereinafter referred to, through an A/D converter 96. When a starter motor starting switch 97 is on, its on-state signal is applied to another level shifter circuit 98 and then to the above arithmetic unit through a digital input module 99. The above arithmetic unit includes CPU 100, an RAM 101, a program ROM 102, a data ROM 103, counters 104, 105, 106, 107 for counting the valve opening periods Ti of the main injectors of the respective engine cylinders, a counter 108 for counting the valve opening period Ti of the subinjector, which is operable during TDC signal-asynchronous control operation, a counter 109 for counting the valve opening period Ti of the subinjector, and a pulse duty factor control circuit 110 for controlling the energization of the solenoid of the EGR control valve. CPU 100 is responsive to output signals of the above sensors inputted thereto through the A/D converter 96 to selectively read data from memories 101, 102, 103 and send commands to main injector Ti counters 104–107 and a TDC signal-asynchronous Ti counter 108. These counters 104–108 are responsive to the commands from CPU 100 to apply output pulses having pulse widths corresponding to required injector valve opening periods to an injector driving circuit 112, in synchronism with pulses of the TDC signal and the asynchronous control signal. During asynchronous control, output pulses (i.e. pulse widths) of the counters 104–107 and the counter 108 are added together in an asynchronous Ti adder circuit 111. Then, the injector driving circuit 112 applies output signals to the main injectors 11, 11a–11c provided in the engine cylinders, for driving their solenoids. The output signal of the subinjector Ti counter 109 is also applied to the injector driving circuit 112 which in turn applies a solenoid driving output signal to the subinjector 12. On the other hand, the pulse duty factor control circuit 110 for EGR control valve produces duty-controlled output pulses to an EGR control valve driving circuit 113 which in turn drives the EGR control valves 58, 59 in response to the above output pulses inputted thereto. Incidentally, the engine rpm counter 114 appearing in FIG. 3 produces an output as a function of the pulse separation of the TDC signal, which is a reciprocal of engine rpm, and applies same to CPU 100.

Figure 4:
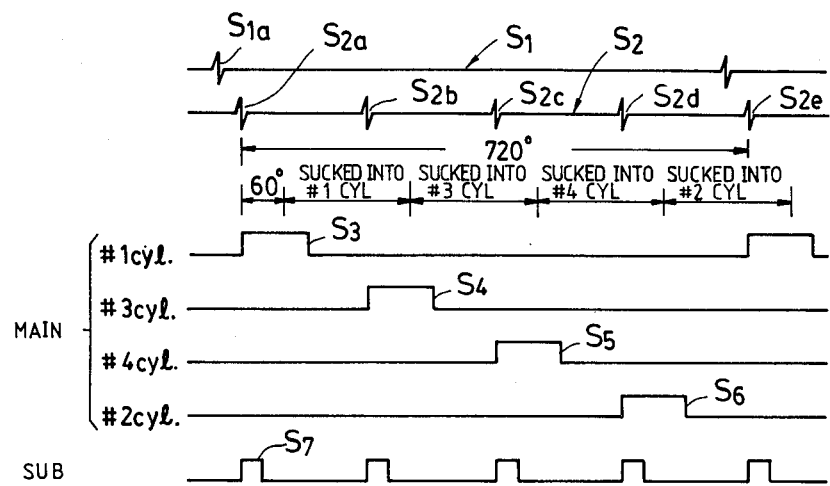
FIG. 4 is a timing chart showing the relationship between a cylinder-discriminating signal and a TDC signal inputted to ECU, and drive signals for the main injectors and the subinjector, outputted from ECU.

FIG. 4 is a timing chart showing the relationship between the cylinder-discriminating signal and the TDC signal, both inputted to ECU 9, and the driving signals outputted from ECU 9 for driving the main injectors and the subinjector. The cylinder-discriminating signal $S_1$ is inputted to ECU 9 in the form of a pulse $S_{1a}$ each time the engine crank shaft rotates through 720 degrees. Pulses $S_{2a}$–$S_{2e}$ forming the TDC signal $S_2$ are each inputted to ECU 9 each time the engine crank shaft rotates through 180 degrees. The relationship in timing between the two signals $S_1$, $S_2$ determines the output timing of driving signals $S_3$–$S_6$ for driving the main injectors of the four engine cylinders. More specifically, the driving signal $S_3$ is outputted for driving the main injector of the first engine cylinder, concurrently with the first TDC signal pulse $S_{2a}$, the driving signal $S_4$ for the third engine cylinder concurrently with the second TDC signal pulse $S_{2b}$, the driving signal $S_5$ for the fourth cylinder concurrently with the third pulse $S_2c$, and the driving signal $S_6$ for the second cylinder concurrently with the fourth pulse $S_2d$, respectively. The subinjector driving signal $S_7$ is generated in the form of a pulse upon application of each pulse of the TDC signal to ECU 9, that is, each time the crank shaft rotates through 180 degrees. It is so arranged that the pulses $S_2a$, $S_2b$, etc. of the TDC signal are each generated earlier by 60 degrees than the time when the piston in an associated engine cylinder reaches its top dead center, so as to compensate for arithmetic operation lag in ECU 9, and a time lag between the formation of a mixture and the suction of the mixture into the engine cylinder, which depends upon the opening action of the intake pipe before the piston reaches its top dead center and the operation of the associated injector.

Figure 5:
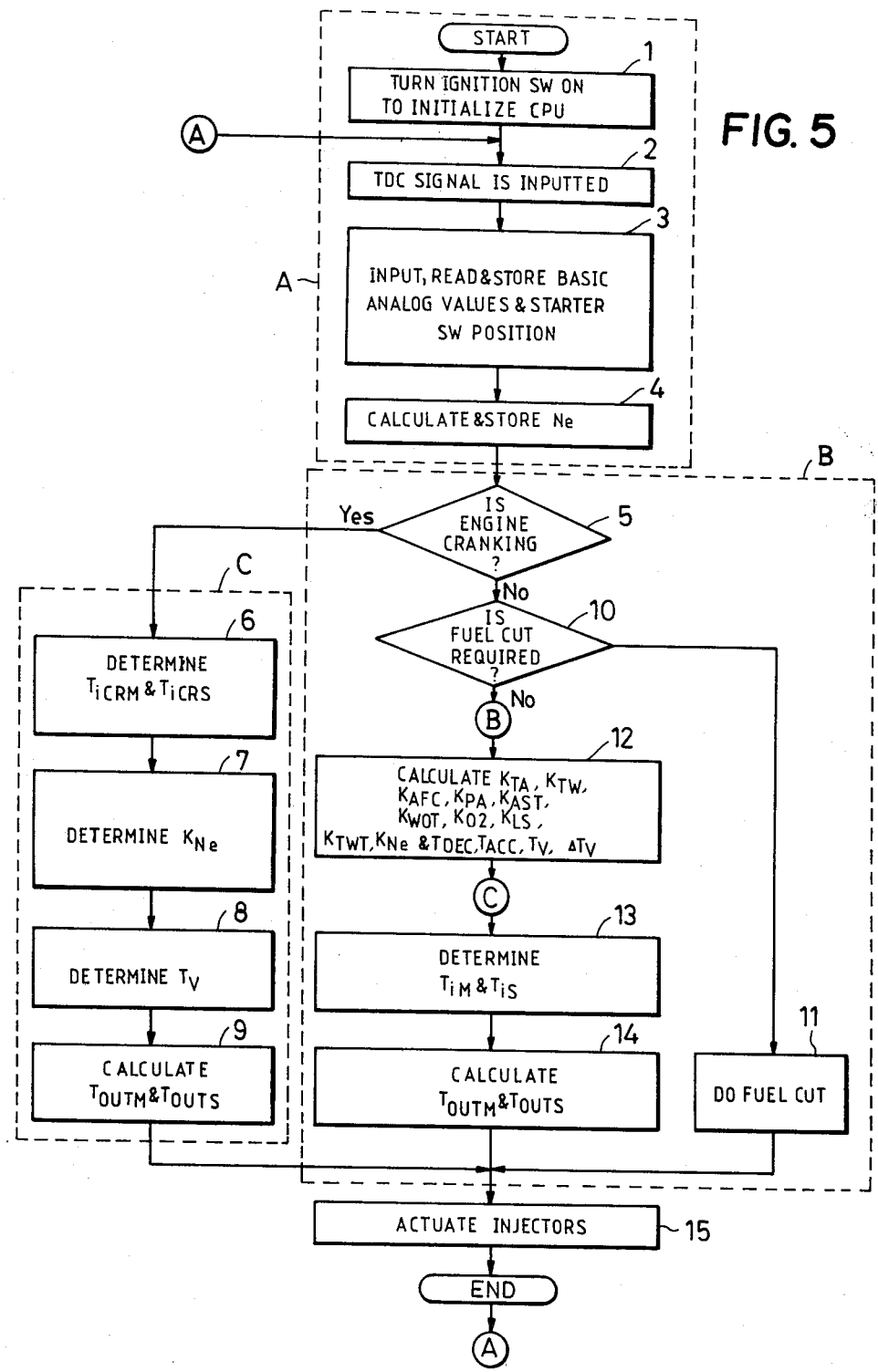
FIG. 5 is a flow chart showing a main program for control of the fuel supply.

Referring next to FIG. 5, there is shown a flow chart of the aforementioned first program 1 for control of the valve opening period in synchronism with the TDC signal in ECU 9. The whole program comprises an input signal processing block A, a basic control block B and a start control block C. First in the input signal processing block A, when the ignition switch 87 in FIG. 1 is turned on, CPU is initialized at the step 1 and the TDC signal is inputted to ECU 9 as the engine starts at the step 2. Then, all basic analog values are inputted to ECU 9, which include detected values of atmospheric pressure PA, absolute pressure PB, engine cooling water temperature TW, atmospheric air temperature TA, valve body lift L of the exhaust gas recirculation valve and throttle valve opening $\theta$th, battery voltage V, output voltage value V of the $O_2$ sensor and on-off state of the starter switch 97, some necessary ones of which are then stored therein (step 3). Further, the period between a pulse of the TDC signal and the next pulse of same is counted to calculate actual engine rpm Ne on the basis of the counted value, and the calculated value is stored in ECU 9 (step 4). A determination is made, using the calculated Ne value, as to whether or not the engine rpm is smaller than the cranking rpm (starting rpm) at the step 5. If the answer is affirmative, the programs proceeds to the start control subroutine C. In this block, values of TiCRM and TiCRS are selected from a TiCRM table and a TiCRS table, respectively, on the basis of the detected value of engine cooling water temperature TW (step 6). Also, the value of Ne-dependent correction coefficient KNe is determined by using the KNe table (step 7). Further, the value of battery voltage-dependent correction constant TV is determined by using the TV table (step 8). These determined values are applied to the aforementioned equations (1), (2) to calculate the values of TOUTM, TOUTS (step 9).

If the answer to the question of the above step 5 is no, it is determined whether or not the engine is in a condition for carrying out fuel cut, at the step 10. If the answer is yes, the values of TOUTM, TOUTS are both set to zero to effect fuel cut (step 11).

On the other hand, if the answer to the question of the step 10 is negative, calculation is made of values of correction coefficients KTA, KTW, KAFC, KPA, KAST, KWOT, $KO_2$, KLS, KTWT, KNe, and values of correction constants TDEC, TACC, TV, $\Delta$TV (step 12). These correction coefficients and constants have their values determined by and from their respective subroutines and tables hereinafter referred to. Encircled symbols B and C in FIG. 5 correspond, respectively, to encircled symbols B and C in the other figures showing the subroutines.

The values of TiM, TiS are selected from respective maps, as functions of the data of engine rpm Ne, absolute pressure PB and exhaust gas recirculation valve lift L (step 13). Then, the correction coefficient values, the correction constant values and the basic values thus obtained at the steps 12 and 13 are applied to the aforementioned equations (3), (4) to calculate the values of TOUTM, TOUTS (step 14). The main injectors and the subinjector are actuated with valve opening periods corresponding to the values of TOUTM, TOUTS thus obtained (step 15).

Details of the above-stated TDC signal-synchronized control will now be described:

TDC Signal-Synchronous Control

Figure 6:
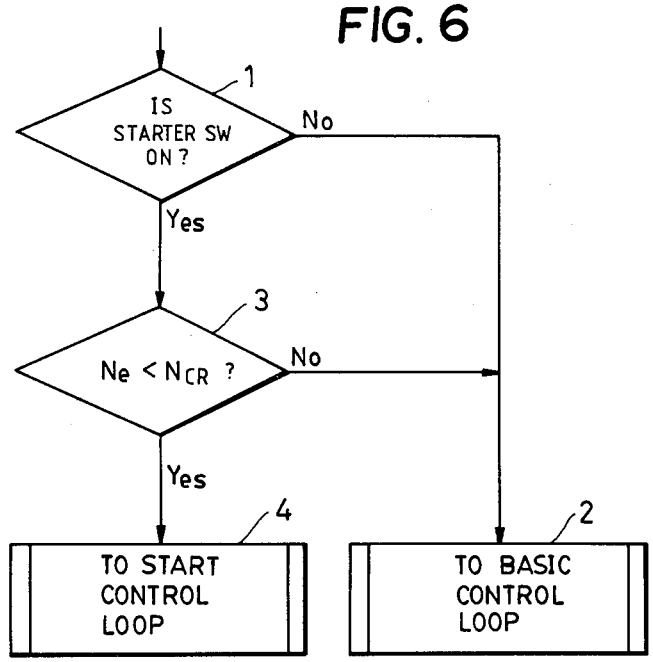
FIG. 6 is a flow chart showing a subroutine for determining whether or not the engine is in a cranking state.

Cranking Determining Subroutine:

FIG. 6 is a flow chart showing the subroutine of the step 5 in FIG. 5 for determining whether or not the engine is in a cranking state. According to this cranking determining subroutine, first a determination is made as to whether or not the starter switch is on, at the step 1. If the switch is off, the engine is of course not regarded as being in a cranking state and the program proceeds to the basic control loop (step 2), while if the switch is on, it is determined whether or not the engine rpm Ne is lower than a predetermined cranking rpm NCR (e.g. 400 rpm), at the step 3. If the former is higher than the latter, the computer regards the engine as not being cranking and the program proceeds to the basic control loop. If the former is lower than the latter, the computer judges the engine is in a cranking state to have the program proceed to the start control loop (the block C in FIG. 5) (step 4).

Figure 7:
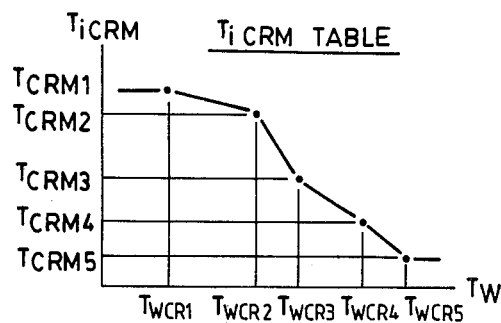
FIG. 7 is a view showing a table of the relationship between engine cooling water temperature TW and the basic injection period TiCRM of the main injectors applicable at the start of the engine.

Start Subroutine:

FIG. 7 shows a table plotting the relationship between engine cooling water temperature TW and basic operating 15 period TiCRM for the main injectors applicable at the start of the engine, which is used in the TiCRM determining subroutine in the start control block C in FIG. 7. The value of TiCRM is determined as a function of engine cooling water temperature TW. Calibration variants of TiCRM, TWCR are provided which comprise predetermined values TiCRM1-5 and TWCR1-5, respectively and arranged in relation to each other. If the actual water temperature TW falls between adjacent ones of TWCR1-5, the value of TiCRM is calculated by using an interpolation method.

Figure 8:
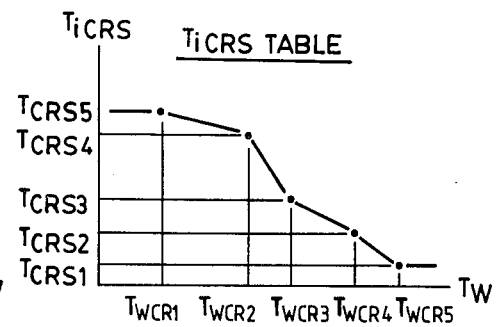
FIG. 8 is a view showing a table of the relationship between engine cooling water temperature TW and the basic injection period TiCRS of the subinjector applicable at the start of the engine.

FIG. 8 shows a table plotting the relationship between engine cooling water temperature TW and basic operating period TiCRS for the subinjector applicable at the start of the engine, wherein the value of TiCRS is determined as a function of engine cooling water TW in the same manner as in FIG. 7. (step 6 in FIG. 5).

Figure 9:
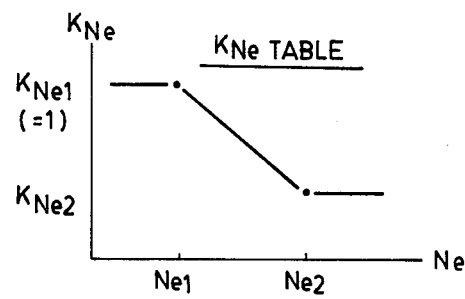
FIG. 9 is a view showing a table of the relationship between engine rpm and rpm-dependent correction coefficient KNe applicable at the start of the engine.

Referring to FIG. 9, there is shown a table plotting the relationship between engine rpm Ne and engine rpm-dependent correction coefficient KNe, which is used in the step 7 in FIG. 5. The value of correction coefficient KNe is determined as a function of engine rpm Ne. If the actual engine rpm Ne is lower than the lower predetermined rpm Ne1 (e.g. 300 rpm), the value of KNe is determined as 1, while if it is higher than the higher predetermined prm Ne2 (e.g. 500 rpm), the KNe value is determined as 0.5. If the actual engine rpm falls between Ne1 and Ne2, the KNe value is calculated by means of an interpolation method.

The above data values are applied to the equations (1), (2) to calculate the values of valve opening periods TOUTM, TOUTS for the main injectors and the subinjector.

Figure 10:
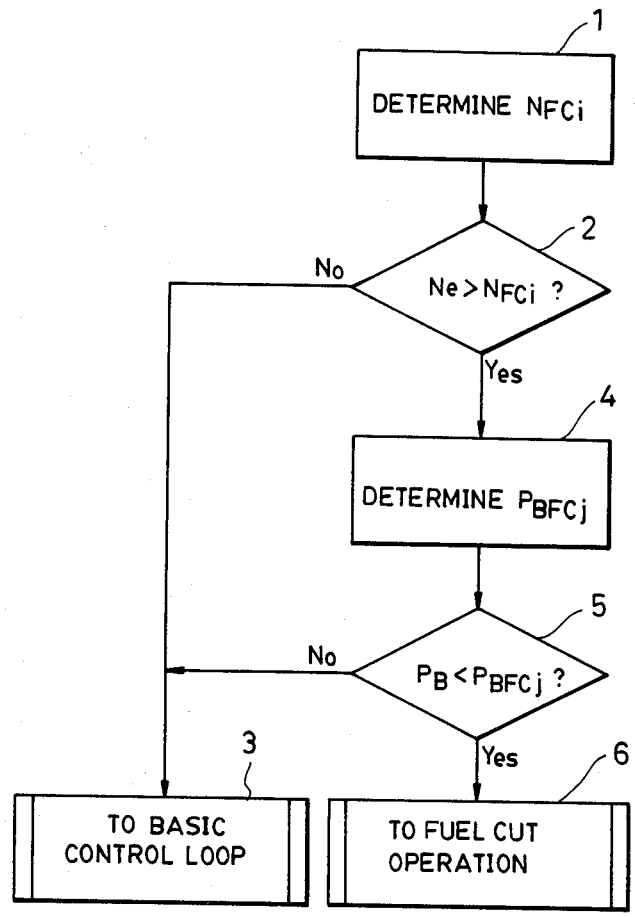
FIG. 10 is a flow chart showing a subroutine for determining the fuel cut operation of the engine.

Fuel Cut Determining Subroutine:

In FIG. 10, there is shown a flow chart of the fuel cut determining subroutine which is executed when the program moves to the basic control loop 2 as a result of determination of the cranking state of the engine in FIG. 6.

Figure 11A:
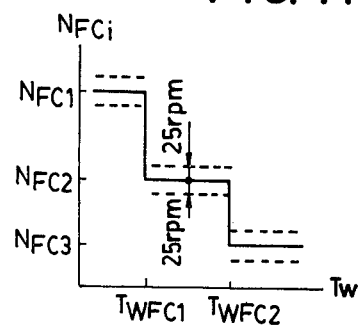
FIG. 11a is a view showing a table of the relationship between engine cooling water temperature TW and fuel cut determining rpm NFCi.
Figure 11B:
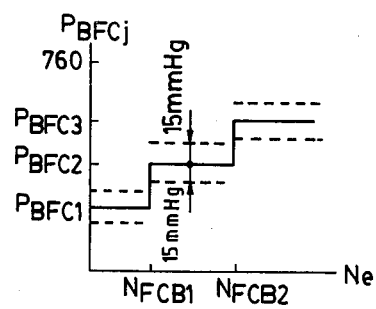
FIG. 11b is a view showing a table of the relationship between engine rpm Ne and fuel cut determining absolute pressure PBFCj.

First, at the step 1 the engine cooling water temperature TW is used to determine the value of fuel cut determining rpm NFCi. FIG. 11a shows an NFCi table plotting, as an example, the relationship between the engine cooling water TW and the fuel cut determining rpm NFCi. According to this table, two predetermined water temperature values TWFC1 (20° C.) and TWFC2 (50° C.) are provided, while predetermined fuel cut determining rpm values NFCi (2000 rpm), NFC2 (1600 rpm) and NFC3 (1200 rpm) are provided in relation to the above predetermined water temperature values. The above predetermined fuel cut determining rpm values are each provided with a hysteresis margin of ±25 rpm. That is, as to the value NFC2, to interrupt the fuel cut operation, the actual engine rpm has to be lower than 1575 rpm, while to resume the same operation it should be higher than 1625 rpm. Reverting now to the subroutine of FIG. 10, whether or not the actual engine rpm Ne is higher than the fuel cut determining rpm NFCi is determined at the step 2. If the former is found to be lower than the latter, the program proceeds to the basic control loop at the step 3, while if the former is higher than the latter, the value of fuel cut determining absolute pressure PBFCj is determined in dependence upon the actual engine rpm Ne at the step 4. FIG. 11b shows a PBFCj table plotting an example of the relationship between the engine rpm Ne and the fuel cut determining absolute pressure PBFCj. According to this table, two predetermined rpm values NFCB1 (1500 rpm) and NFCB2 (3000 rpm) are provided as examples of the fuel cut determining engine rpm, while three predetermined absolute pressure values PBFC1 (180 mmHg), PBFC2 (200 mmHg) and PBFC3 (220 mmHg) are provided as examples of the fuel cut determining absolute pressure. These predetermined absolute pressure values are each provided with a hysteresis margin of ±15 mmHg. That is, in the case of the value PBFC2, to interrupt the fuel cut operation, the actual absolute pressure has to be higher than 215 mmHg, while to resume the same operation, it should be lower than 185 mmHg. Reverting to the subroutine of FIG. 10, a determination is made as to whether or not the actual absolute pressure PB is higher than the above fuel cut determining absolute pressure PBFCj at the step 5. If the answer is no, the program proceeds to the basic control loop, while if the answer is yes, the fuel cut operation is performed at the step 6.

Figure 12:
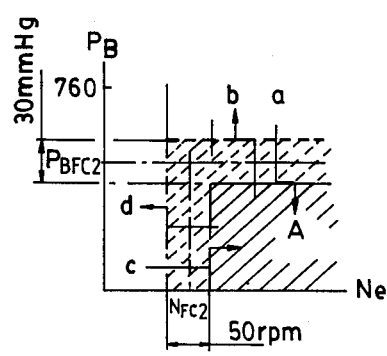
FIG. 12 is a graph showing a fuel cut operating region determined by engine rpm Ne and absolute pressure PB.
Figure 13:
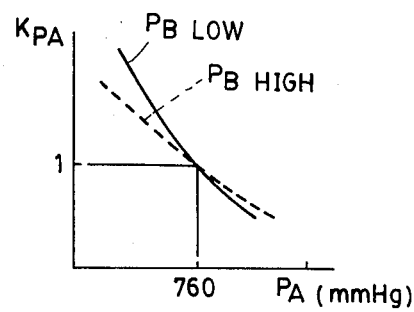
FIG. 13 is a graph showing the relationship between atmospheric pressure PA and atmospheric pressure-dependent correction coefficient KPA with main intake pipe-absolute pressure PB as a parameter.

FIG. 12 shows a fuel cut operating region A determined by the engine rpm Ne and the absolute pressure PB. Taking the fuel cut determining rpm NFC2 and the fuel cut determining absolute pressure PBFC2 for instance, the arrow a designates a case where the fuel cut operation is effected as the absolute pressure PB drops. In this case, the fuel cut determining absolute pressure PBFCj is set at 185 mmHg. Inversely, when the fuel cut operation is interrupted, the fuel cut determining absolute pressure PBFCj is set at 215 mmHg as indicated by the arrow b. The arrow c indicates a case where the fuel cut operation is carried out due to an increase in the engine rpm Ne. In this case, the fuel cut determining rpm NFCi assumes a value of 1625 rpm. Inversely, in interrupting the fuel cut operation, the fuel cut determining rpm NFCi has a value of 1575 rpm as indicated by the arrow d. By providing the fuel cut determining rpm NFCi and the fuel cut determining absolute pressure PBFCj with hysteresis margins so that they have different values between entrance into the fuel cut operation and interruption of same as mentioned above, any fine fluctuations in the actual engine rpm Ne and the actual absolute pressure PB can be cancelled to ensure stable operation of the engine.

Calculation of Correction Constants

Atmospheric Pressure-Dependent Correction Coefficient KPA:

The value of atmospheric pressure-dependent correction coefficient KPA is calculated from the following equation:

$$KPA = \frac{1 - \frac{1}{\epsilon}\left(\frac{PA}{PB}\right)^{1/K}}{1 - \frac{1}{\epsilon}\left(\frac{PAO}{PB}\right)^{1/K}}$$

where PA is defined as atmospheric pressure, PA0 as reference atmospheric pressure, e.g. 760 mmHg, $\epsilon$ as compression ratio of the engine, and K as ratio of specific heat (1.4 in the case of air), respectively. The above equation is graphed in FIG. 13.

Figure 14A:
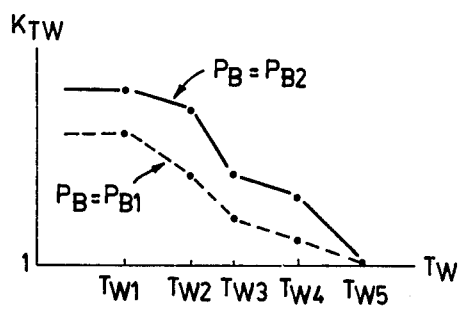
FIG. 14a is a view showing a table of the relationship between engine cooling water temperature TW and water temperature-dependent fuel increasing coefficient KTW.
Figure 14B:
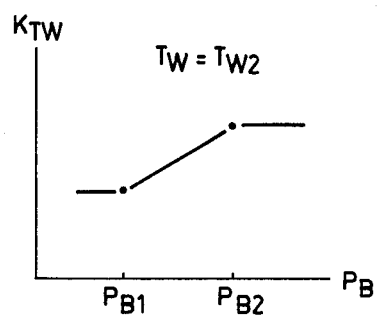
FIG. 14b is a graph showing the relationship between absolute pressure PB and water temperature-dependent fuel increasing coefficient KTW, based on the assumption that water temperature TW remains unchanged.
Figure 15:
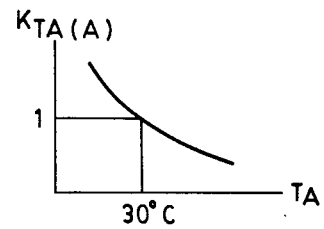
FIG. 15 is a graph showing the relationship between intake air temperature TA and intake air temperature-dependent correction coefficient KTA.

Water Temperature-Dependent Fuel Increasing Coefficient KTW:

FIG. 14a shows a KTW table plotting the relationship between the engine cooling water temperature TW and the water temperature-dependent fuel increasing coefficient KTW. It is noted from the table that the coefficient KTW has a value of 1 when the water temperature TW is higher than a predetermined value TW5 (e.g. 60° C.), while in the event that the water temperature TW is lower than the above predetermined value TW5, the value of the coefficient KTW is selected from five different values of KTW provided, respectively, for five predetermined values of water temperature TW1-5 which form calibration variants. When the water temperature TW shows a value other than the variants TW1-5, the value of KTW is determined by means of an interpolation method. FIG. 14b is a graph plotting the relationship between the absolute pressure PB and the coefficient KTW, based on the assumption that the water temperature TW remains constant. According to this graph, there are provided two predetermined absolute pressure values PB1 (e.g. 400 mmHg) and PB2 (e.g. 300 mmHg) as examples of the absolute pressure PB. When the absolute pressure PB is lower than PB1 or higher than PB2, the coefficient KTW has a constant value. When the absolute pressure PB lies between the two predetermined values PB1, PB2, the value of KTW is determined by means of an interpolation method. In determining the value of KTW by means of an interpolation method, the interpolation calculation based on TW may be preceded by that based on PB.

Water Temperature-Dependent Fuel Increasing Coefficient KTWT Applicable at Synchronous Acceleration Control, Post-Acceleration Control and Asynchronous Acceleration Control:

The value of water temperature-dependent fuel increasing coefficient KIWT which is applied during acceleration control which is effected in synchronism with the TDC signal (hereinafter called "synchronous acceleration control"), post-acceleration control in synchronism with the TDC signal, and TDC signal-asynchronous acceleration control is determined from the following equation:

$$KTWT = CTWT (KTW - 1) + 1.0 \tag{6}$$

where CTWT is a calibration variant and is set at a value within a range of 1-3, for instance.

Intake Air Temperature-Dependent Correction Coefficient KTA:

The intake air temperature-dependent correction coefficient KTA is calculated from the following equation:

$$KTA = (TA0 + 273/TA + 273 \times -1) \times CTA + 1$$

where TA is defined as intake air temperature (°C.), TAO as reference intake air temperature, e.g. 30° C., and CTA as a calibration variant, respectively. The value of CTA is set at a value within a range of 0.5-2.0, for instance. The above equation is graphically represented in FIG. 15.

Figure 16:
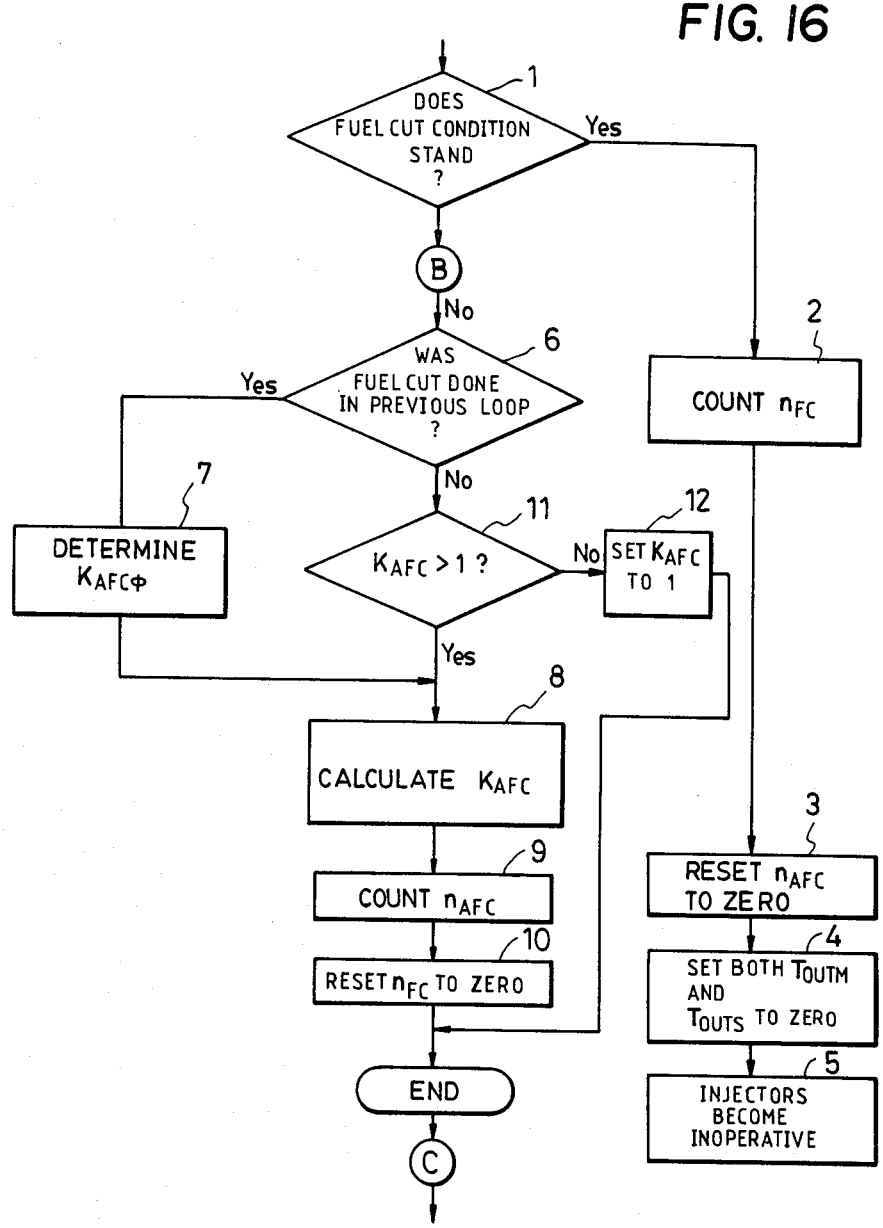
FIG. 16 is a flow chart showing a subroutine for calculation of after-fuel cut fuel increasing coefficient KAFC.

Subroutine for Determining After-Fuel Cut Fuel Increasing Coefficient KAFC:

The after-fuel cut fuel increasing coefficient KAFC is used to increase the fuel injection quantity for a predetermined period of time after the fuel cut operation has finished. FIG. 16 shows a flow chart of the subroutine for calculating the value of KAFC. First in the aforementioned fuel cut determining subroutine, a determination is made as to whether or not the fuel cut condition stands, that is, whether or not the fuel cut operation is going on now, at the step 1. If the answer is affirmative, the number of pulses nFC of the TDC signal is counted as long as the fuel cut operation is carried out, at the step 2. Actually, 1 is added to the count each time one pulse of the TDC signal is inputted to ECU 9. Simultaneously with execution of the step 2, the number of pulses nAFC of the TDC signal inputted to and stored in ECU 9 after completion of the previous fuel cut operation is resetted to zero at the step 3. Also, the valve opening periods TOUTM, TOUTS for the injectors are both set to zero at the step 4, to render the main injectors and the subinjector inoperative at the step 5.

Figure 17:
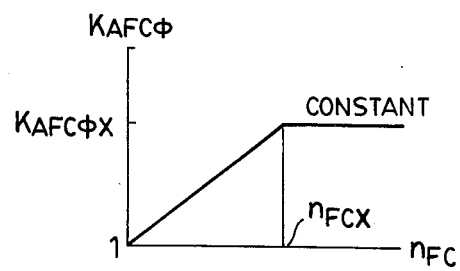
FIG. 17 is a graph showing the relationship between the number of TDC signal pulses NFC counted during fuel cut operation and the initial value KAFC∅ of after-fuel cut fuel increasing coefficient KAFC.

On the other hand, if it is determined at the step 1 that the fuel cut condition does not stand, it is then determined at the step 6 whether or not the fuel cut operation was carried out in the previous loop. If the answer is yes, the initial value KAFC∅ of the after-fuel cut fuel increasing coefficient KAFC is determined at the step 7, which is applied to the valve opening period control after the previous-loop fuel cut operation, by using the graph of FIG. 17 and on the basis of the number of pulses nFC of the TDC signal counted during the previous-loop fuel cut operation. As shown in FIG. 17, the initial value KAFC∅ of the after-fuel cut fuel increasing coefficient KAFC increases in proportion to the number of TDC signal pulses nFC (nFCi in the figure) counted during the previous-loop fuel cut operation until the number nFC reaches a predetermined value nFCX, and remains constant after the predetermined value nFCX has been exceeded.

The initial value KAFC∅ thus determined is then applied to the following equation to calculate the value of coefficient KAFC (step 8):

$$KAFC = KAFC\emptyset - nAFC/nAFCR \tag{7}$$

where 1/nAFCR is an attenuation constant.

To calculate the value of KAFC at the above step 8, the number of TDC signal pulses nAF is counted after the fuel cut operation, at the step 9, and at the same time the number of TDC signal pulses nFC counted during the previous-loop fuel cut operation is resetted to zero at the step 10. Then, the program proceeds to the next stage.

On the other hand, if the answer to the question of the step 6 is no, that is, fuel cut operation was not done in the previous loop, it is determined whether or not the value of after-fuel cut fuel increasing coefficient KAFC is larger than 1, at the step 11. If the answer is yes, the value of coefficient KAFC is calculated from the equation (7), using the same KAFC value as the initial value KAFC∅, at the step 8. If the KAFC value is found to be less than 1 at the step 11, the same coefficient KAFC is set to 1 at the step 12, followed by calculation of the values of TOUTM, TOUTS using the KAFC value of 1.

Figure 18:
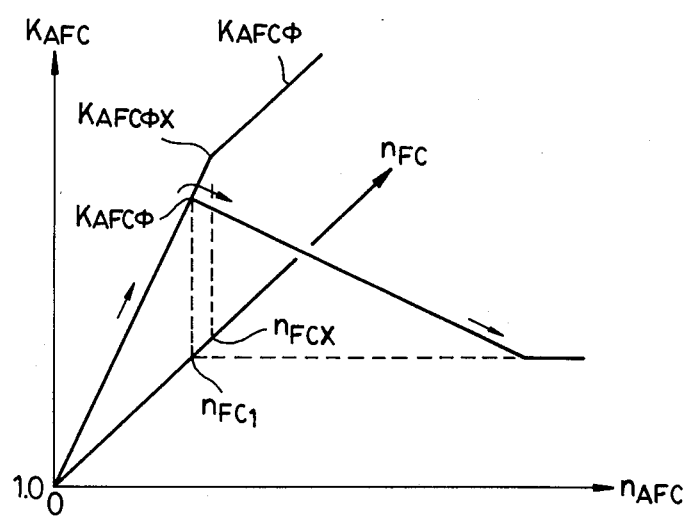
FIG. 18 is a graph showing in a composite manner the relationship between the number of TDC signal pulses NAFC counted after fuel cut operation and after-fuel cut fuel increasing coefficient KAFC, and the relationship between the TDC signal pulse number NFC counted during fuel cut operation in FIG. 17 and the initial value KAFC∅ of after-fuel cut fuel increasing coefficient KAFC obtained upon termination of fuel cut operation.
Figure 19:
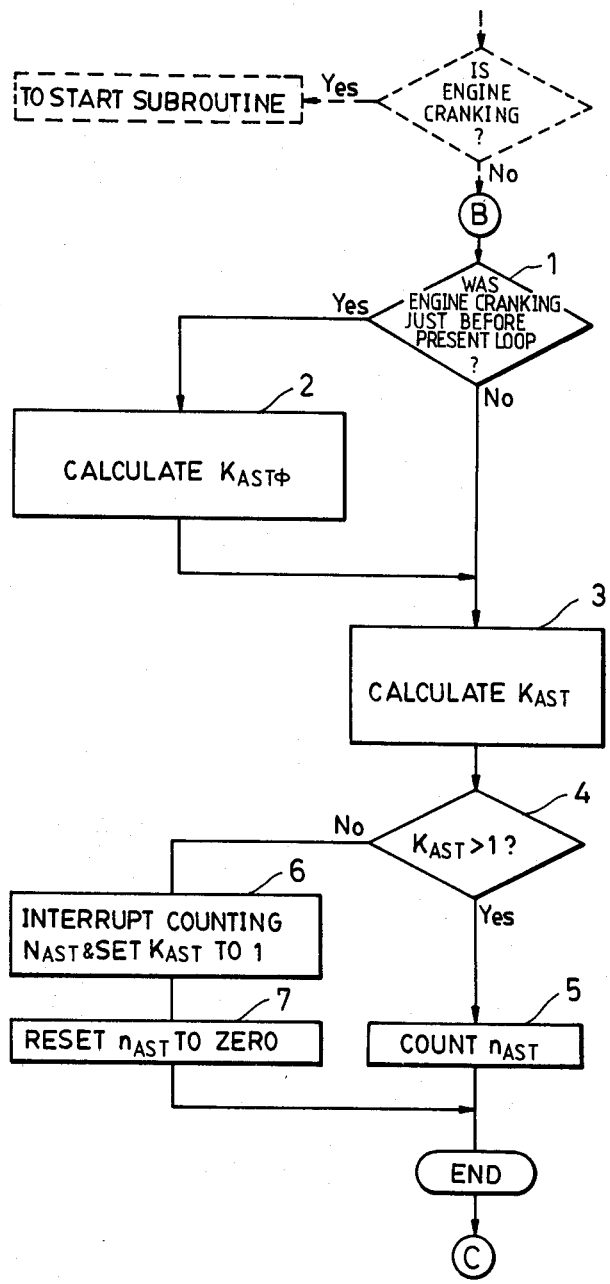
FIG. 19 is a flow chart showing a subroutine for calculation of after-start fuel increasing coefficient KAST.

That is, as shown in FIG. 18, the fuel increasing coefficient KAFC is gradually reduced until it becomes equal to 1, as the number of TDC pulses nAFC increases after the termination of the previous-loop fuel cut operation.

Subroutine for Calculation of After-Start Fuel Increasing Coefficient KAST:

If at the step 5 of FIG. 5 the cranking operation (starting operation) is determined to have finished, an increased amount of fuel should be supplied to the engine for a predetermined period of time. The fuel increasing coefficient KAST has its value determined by a subroutine shown in FIG. 19. A determination is made as to whether or not the engine was in a cranking state just before the present loop at the step 1. If it has been determined that the engine was cranking, the initial value KAST∅ of after-start fuel increasing coefficient KAST is calculated from the following equation (step 2):

$$KAST\emptyset = CAST \times KTW \tag{8}$$

where CAST is defined as a calibration variant, and KTW as the water temperature-dependent fuel increasing coefficient, respectively. The coefficient KTW is shown in FIG. 14a, previously referred to, and has its value determined along the curve indicating the higher predetermined absolute pressure value PB2. Then, based upon the initial value KAST∅ thus obtained, the value of fuel increasing coefficient KAST is calculated from the following equation (step 3):

$$KAST = KAST\emptyset - nAST/nASTR \tag{9}$$

where 1/nASTR means an attenuation constant, and nAST the number of TDC signal pulses counted after the start of the engine, respectively. It is then determined whether or not the value of coefficient KAST has become smaller than 1, at the step 4. If the answer is no, counting is made of the TDC signal pulse number nAST at the step 5 to continue the calculation of coefficient KAST by means of the equation (9). When the value of coefficient KAST decreases below 1, the counting of the TDC signal pulse number nAST is interrupted and the KAST value is set to 1 at the step 6. At the same time, the TDC signal pulse number nAST so far counted is resetted to zero at the step 7.

Figure 20:
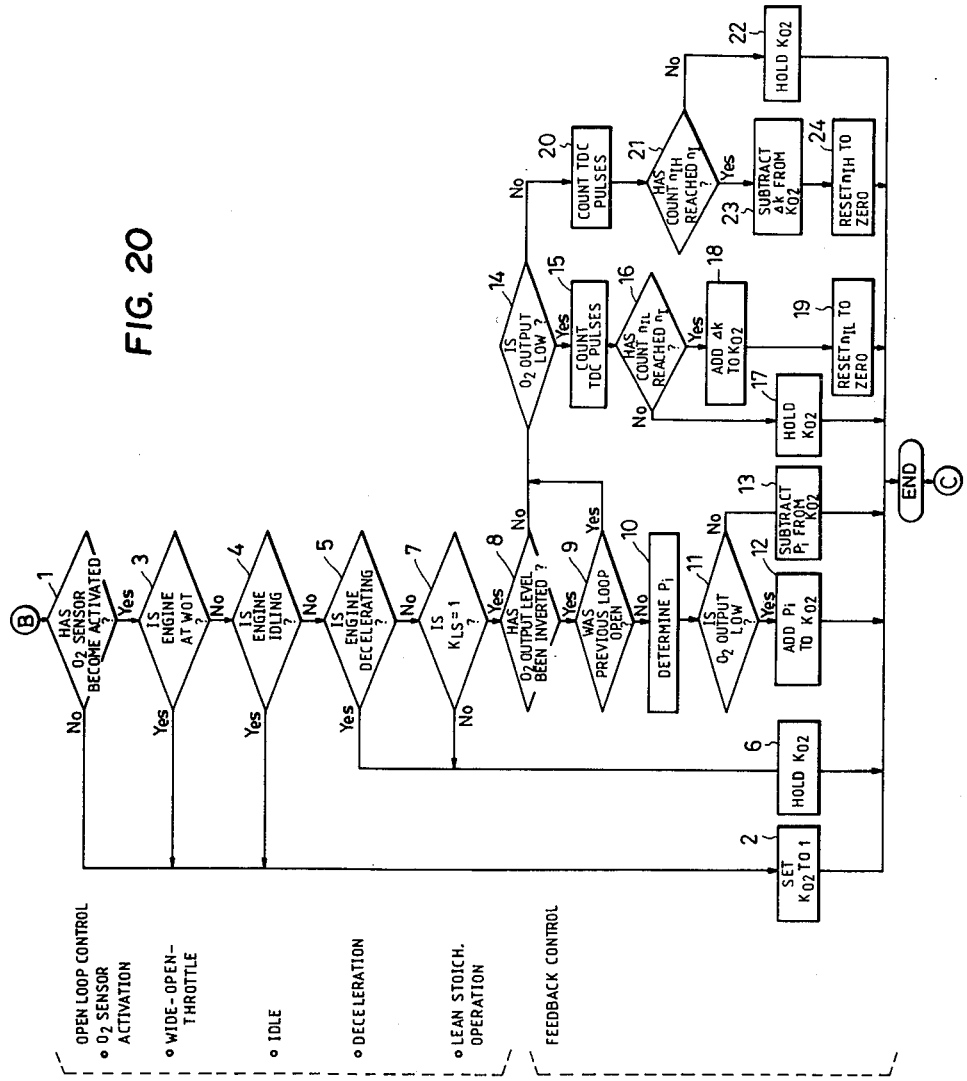
FIG. 20 is a flow chart showing a subroutine for calculation of "O$_2$-feedback control" correction coefficient KO$_2$.

Subroutine for Calculation of O₂ Feedback Control Correction Coefficient KO₂:

The subroutine for calculating the value of "O₂ feedback control" correction coefficient $KO_2$ is shown in a flow chart in FIG. 20.

First, a determination is made as to whether or not the O₂ sensor has become activated, at the step 1. More specifically, by utilizing the internal resistance of the O₂ sensor, it is detected whether or not the output voltage of the O₂ sensor has dropped to an initial activation point VX (e.g. 0.6 volt). Upon the point VX being reached, an activation-indicative signal is generated which actuates an activation delay timer to start counting a predetermined period of time (e.g. 60 seconds). At the same time, it is determined whether or not both the water temperature-dependent fuel increasing coefficient KTW and the after-start fuel increasing coefficient KAST are equal to 1. If all the above conditions are found to be fulfilled, it is then determined that the O₂ sensor has been activated. If the activation of the O₂ sensor is negated at the step 1, the value of correction coefficient $KO_2$ is set to 1 at the step 2, while when the O₂ sensor is found to be activated, a determination is made as to whether or not the throttle valve is fully opened (wide-open-throttle), at the step 3. If the answer is yes, the value of $KO_2$ is also set to 1 at the step 2. If the throttle valve is not fully opened, whether or not the engine is at idle is determined at the step 4. To be concrete, if the engine rpm Ne is smaller than a predetermined value NIDL (e.g. 1000 rpm) and the absolute pressure PB is lower than a predetermined value PBIDL (e.g. 360 mmHg), the engine is judged to be idling, and then the above step 2 is executed to set the $KO_2$ value to 1. If the engine is not found to be idling, whether or not the engine is decelerating is determined at the step 5. To be concrete, it is judged that the engine is decelerating, when the absolute pressure PB is lower than a predetermined value PBDEC (e.g 200 mmHg), and then the value of $KO_2$ is held at a value occurring just before the present time, at the step 6. On the other hand, if it is determined that the engine is not decelerating, whether or not the mixture leaning coefficient KLS applicable at lean stoich. operation, referred to later, then has a value of 1 is determined at the step 7. If the answer is no, the $KO_2$ value is also held at the above preceding value at the step 6, while if the answer is yes, the program proceeds to the closed loop control which will be described below.

Figure 21:
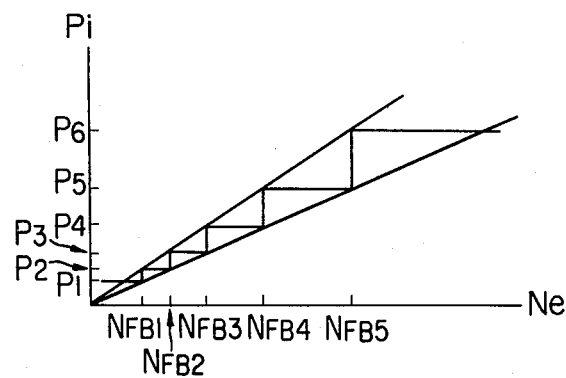
FIG. 21 is a view showing an Ne-Pi table for determining a correction value Pi for correcting "$O_2$-feedback control" correction coefficient $KO_2$.

In the closed loop control, it is first determined whether or not there has occurred an inversion in the output level of the O₂ sensor, at the step 8. If the answer is affirmative, whether or not the previous loop was an open loop is determined at the step 9. If it has been determined that the previous loop was not an open loop, the air/fuel ratio of the mixture is controlled by proportional term control (P-term control). More specifically, referring to FIG. 21 showing an Ne - Pi table for determining a correction amount Pi by which the coefficient $KO_2$ is corrected, five different predetermined Ne values NFB1-5 are provided which has values within a range from 1500 rpm to 3500 rpm, while five different predetermined Pi values P1-6 are provided in relation to the above Ne values. Thus, the value of correction amount Pi is determined from the engine rpm Ne at the step 10, which is added to or subtracted from the coefficient $KO_2$ upon each inversion of the output level of the O₂ sensor. Then, whether or not the output level of the O₂ sensor is low is determined at the step 11. If the answer is yes, the Pi value obtained from the table of FIG. 21 is added to the coefficient $KO_2$ at the step 12, while if the answer is no, the former is subtracted from the latter at the step 13. Reverting to the step 8, if the answer to the question of the step 8 is no, that is, if the O₂ sensor output level remains at the same level, or if the answer to the question of the step 9 is yes, that is, if the previous loop was an open loop, the air/fuel ratio of the mixture is controlled by integral term control (I-term control). More specifically, whether or not the O₂ sensor output level is low is determined at the step 14. If the answer is yes, TDC signal pulses are counted at the step 15, accompanied by determining whether or not the count nIL has reached a predetermined value nI (e.g. 30 pulses), at the step 16. If the predetermined value nI has not yet been reached, the $KO_2$ value is held at its immediately preceding value, at the step 17. If the value nIL is found to have reached the value nI, a predetermined value Δk (e.g. about 0.3 % of the $KO_2$ value) is added to the $KO_2$ value, at the step 18. At the same time, the number of pulses nIL so far counted is resetted to zero at the step 19 so that after this, the predetermined value Δk is added to the $KO_2$ value each time the value nIL reaches the value nI. On the other hand, if the answer to the question of the step 14 is found to be no, TDC pulses are counted at the step 20, accompanied by determining whether or not the count nIH has reached the predetermined value nI at the step 21. If the answer is no at the step 21, the $KO_2$ value is held at its immediately preceding value, at the step 22, while if the answer is yes, the predetermined value Δk is subtracted from the $KO_2$ value, at the step 23, and simultaneously the number of pulses nIH so far counted is resetted to zero at the step 24. Then, the predetermined value Δk is subtracted from the $KO_2$ value each time the value nIH reaches the value nI in the same manner as mentioned above.

Figure 22:
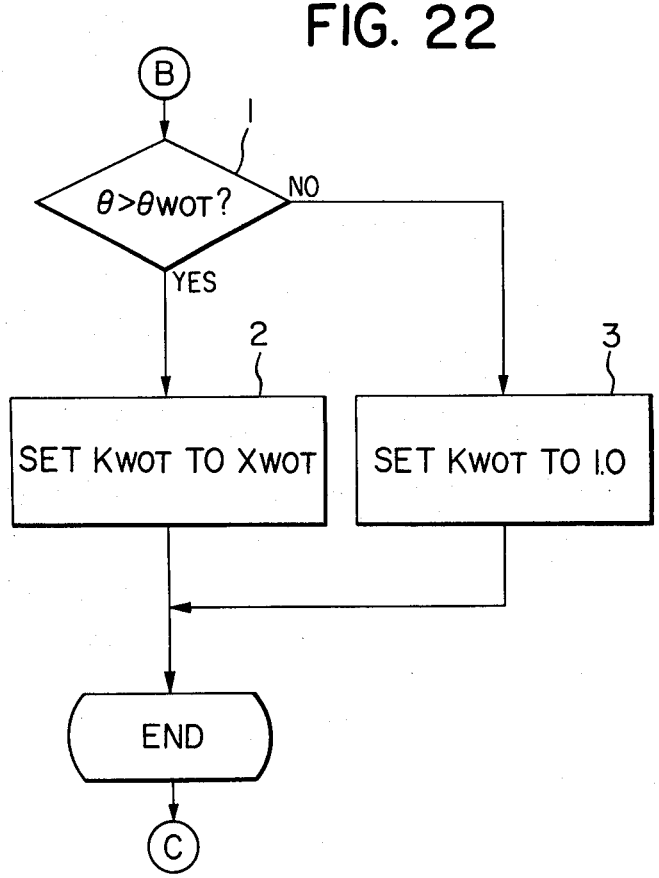
FIG. 22 is a flow chart showing a subroutine for calculation of mixture enriching coefficient KWOT applicable at wide-open-throttle.

Subroutine for Calculation of Mixture Enriching Coefficient KWOT Applicable at Wide-Open-Throttle:

FIG. 22 shows a flow chart of a subroutine for calculating the mixture enriching coefficient KWOT which is applied when the engine is operating at wide-open-throttle. A determination is first made as to whether or not the valve opening θ of the throttle valve is larger than a predetermined opening θWOT (e.g. 50 degrees) which is set as the full valve opening, at the step 1. If the answer is yes, the coefficient KWOT is set to a predetermined value (e.g. 1.2) at the step 2. According to the applicant' system, if the value of 1.2 is applied as KWOT, the resulting air/fuel ratio will be 12.5. If the answer to the question of the step 1 is no, the coefficient KWOT is set to 1.0 at the step 3.

Figure 23:
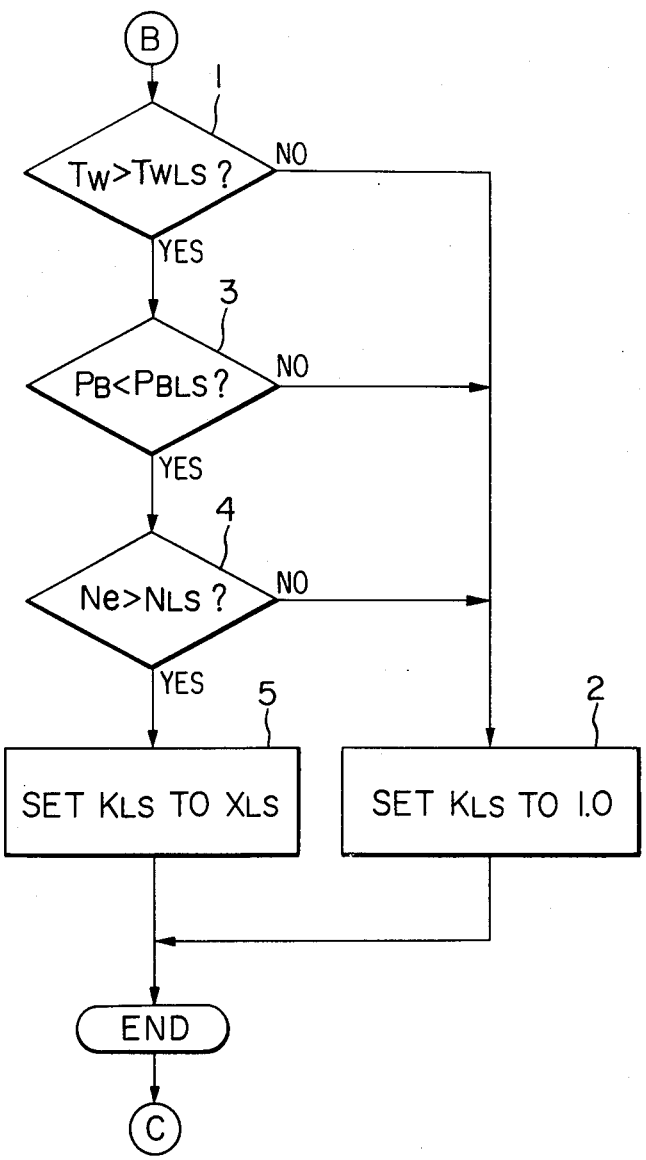
FIG. 23 is a flow chart of a subroutine for calculation of mixture leaning coefficient KLS.

Subroutine for Calculation of Mixture Leaning Coefficient KLS Applicable at Lean-Stoich. Operation:

FIG. 23 shows a flow chart of a subroutine for calculating the mixture leaning coefficient KLS which is applied during the lean-stoich. operation of the engine.

A determination is made as to whether or not the actual engine water temperature TW is higher than a predetermined value TWLS (e.g. 70° C.), at the step 1. This predetermined value TWLS is set at a value at which turning-on of the ignition switch can cause firing in the engine cylinder without fail. If the answer is no, the coefficient KLS is set to 1 at the step 2. If the answer is yes, whether or not the actual absolute pressure PB is lower than a predetermined value PBLS is determined at the step 3.

This predetermined value PBLS is detected by means of the absolute pressure sensor 18 shown in FIG. 1 and is set at a value which cannot be assumed when the engine operates at a speed higher than a predetermined rpm hereinafter referred to, during rapid acceleration or during wide-open-throttle. For instance, the value PBLS is set at a value within a range from 300 to 550 mmHg. Since the predetermined value PBLS is detected in terms of absolute pressure by the absolute pressure 18 which is not affected by ambient atmospheric pressure, the lean-stoich. or mixture leaning operation region can be detected with accuracy even in high altitudes. Detection of pressure in the intake pipe in terms of absolute pressure is particularly advantageous to determination of the mixture leaning operating region, because the charging efficiency of the engine which forms a datum for determining a required air/fuel ratio depends upon the absolute pressure in the intake pipe in a directly proportionate manner. The predetermined value PBLS is set at a value of 510 mmHg with a hysteresis margin of ±5 mmHg, for instance, so that it assumes different values between when the engine enters into the lean-stoich. or mixture leaning operation and when the engine is released from the same operation. To be concrete, the value PBLS has a value of 505 mmHg when the engine enters into the lean-stoich. operation and a value of 515 mmHg when it is released from the same operation. When the actual absolute PB is larger than the predetermined value PBLS, the value of coefficient KLS is set to 1.0. If the former is smaller than the latter, it is determined whether or not the actual engine rpm Ne is higher than a predetermined value NLS, at the step 4.

This predetermined value NLS is detected by the rpm sensor 89 shown in FIG. 1 and set at a value equal to or higher than the possible upper limit of idling rpm, for instance, within a range form 1000 to 1300 rpm. Setting of the predetermined value NLS within the above range makes it possible, in cooperation with setting of the predetermined value PBLS within the aforementioned range, to avoid that in rapidly accelerating from an idle state leaning of the mixture takes place so that the engine cannot exhibit required accelerating performance. The predetermined rpm NLS is set at a value of 1150 rpm with a hysteresis margin of ±50 rpm, for instance, so that it assumes a value of 1200 rpm when the engine enters into the lean-stoich. operation and a value of 1100 rpm when it is released from the same operation. When the actual engine rpm Ne is lower than the predetermined value NLS, the value of KLS is set to 1.0 at the step 2, while when the engine rpm Ne is higher than the value NLS, the KLS value is set to a predetermined value XLS (e.g. 0.8), at the step 5.

Figure 24:
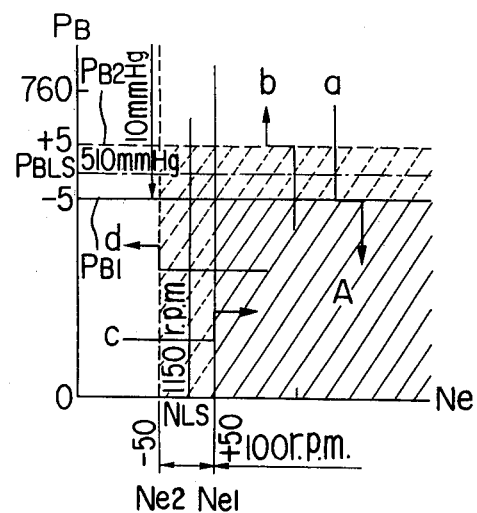
FIG. 24 is a graph showing a "lean-stoich." operating region determined by engine rpm Ne and absolute pressure PB.

FIG. 24 shows a lean-stoich. operation region determined by engine rpm Ne and absolute pressure PB. In the figure, the hatched region A which is defined by the predetermined absolute pressure PBLS and the predetermined engine rpm NLS is the lean-stoich. operation region where the value KLS is set to XLS to lean the mixture, while the other regions outside the region A are stoichiometric air/fuel ratio regions where the value KLS is applied as 1. For instance, in the event that the absolute pressure drops to bring the engine into the lean-stoich. operation region A, the value KLS is set to 0.8 when the absolute pressure PB passes the line PB1 corresponding to 505 mmHg, as indicated by the arrow a. Inversely, in the event that the absolute pressure PB increases to release the engine from the lean-stoich. operation region A, the value KLS is set to 1 when the absolute pressure PB passes the line PB2 corresponding to 515 mmHg, as indicated by the arrow b. On the other hand, when the engine rpm Ne increases to bring the engine into the region A, the value KLS is set to 0.8 at the line $Ne_1$ corresponding to 1200 rpm, as indicated by the arrow c, while when the engine rpm Ne decreases to release the engine from the region A, the value KLS is set to 1 at the line $Ne_2$ corresponding to 1100 rpm, as indicated by the arrow d. As previously mentioned, the provision of the above hysteresis margins substantially cancells any fine fluctuations in the absolute pressure PB and in the engine rpm Ne to enable positively determining whether to effect the lean-stoich. operation, thus leading to stable operation of the engine.

Incidentally, the program is so arranged that when the wide-open-throttle mixture enriching coefficient KWOT is calculated as 1.2, that is, when the throttle valve opening $\theta$ is larger than the predetermined value $\theta$WOT, while simultaneously the engine water temperature TW, the absolute pressure PB and the engine rpm Ne all have values satisfying the lean-stoich. operation condition, the mixture enriching coefficient KLS is set to 1.

Calculations of Constants

Figure 25:
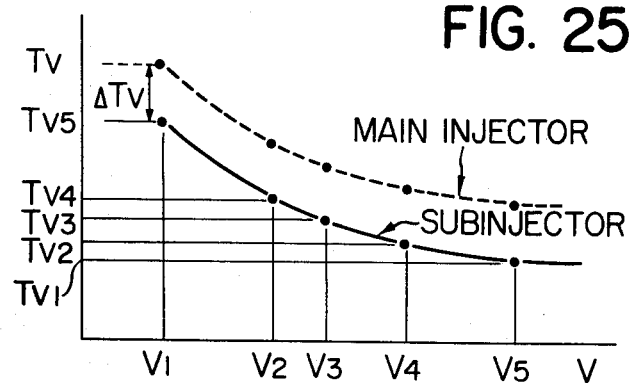
FIG. 25 is a view showing a table of the relationship between battery voltage V and battery voltage-dependent correction constant TV.

Subroutine for Calculation of Battery Voltage-Dependent Constants TV, ΔTV:

FIG. 25 shows a TV table plotting the relationship between the battery voltage V and the voltage-dependent correction constant TV. The value of voltage-dependent correction constant TV is determined from the TV table, which depends upon the actual battery voltage V. For instance, the value of constant TV is set to 1.75 ms, 0.9 ms and 0.3 ms, respectively, when the battery voltage V shows 8 volts, 13 volts and 16 volts. That is, the constant TV is set to a larger value as the battery voltage V increases. While the voltage-dependent constant TV obtained from the TV table is directly applied to the operation of the subinjector, the sum of the above constant TV and another voltage-dependent correction constant ΔTV is applied to the operation of the main injectors, the value of the constant ΔTV always having a value of about 0.3 ms irrespective of changes in the battery voltage V.

Figure 26B:
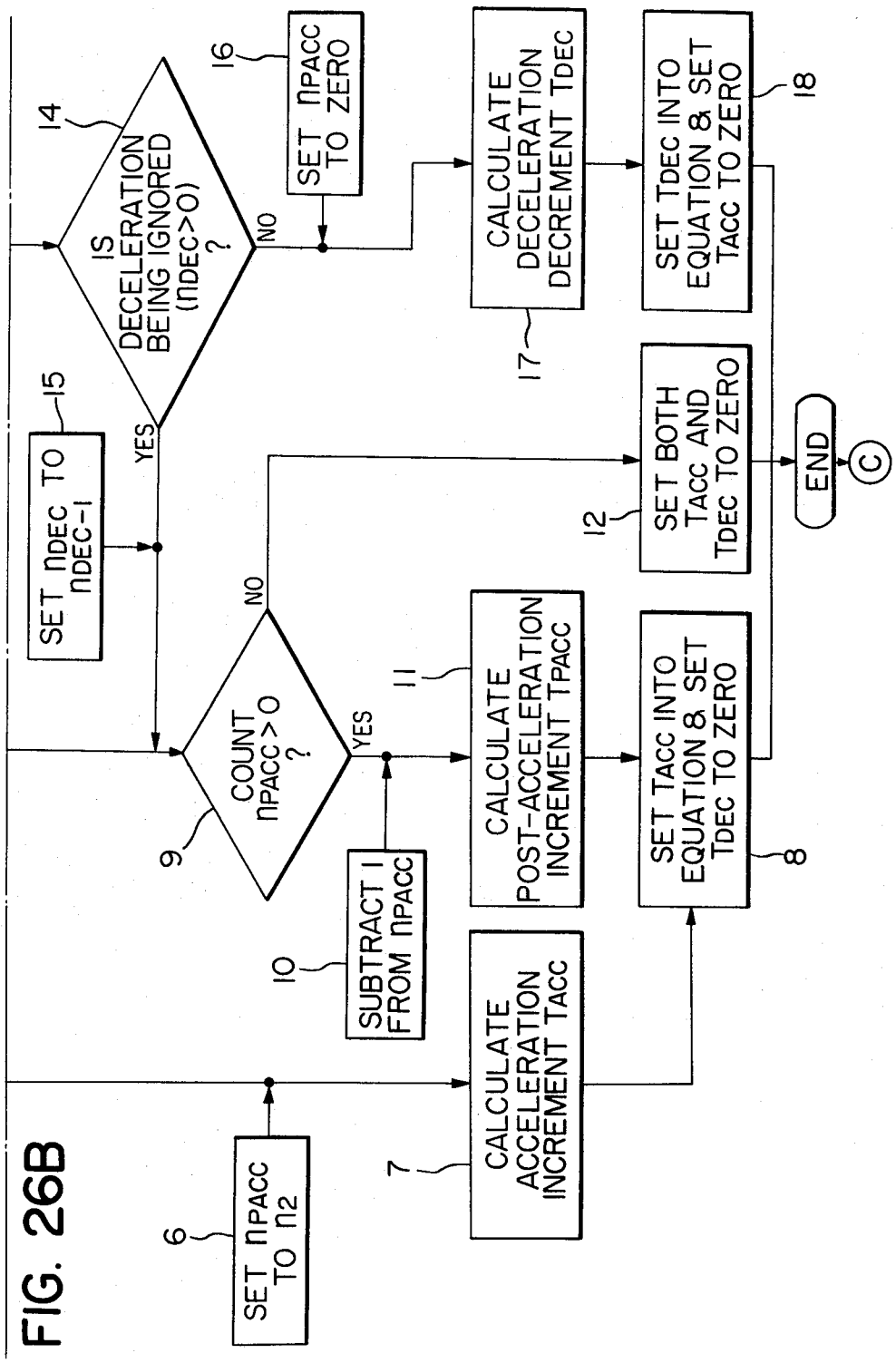

Subroutine for Calculation of Fuel Increasing Constants TACC, TPACC Applicable At Synchronous Acceleration Control and Post-Acceleration Control, Respectively and Fuel Decreasing Constant TDEC Applicable at Synchronous Deceleration Control FIG. 26 shows a flow chart of a subroutine for calculating the fuel increasing constants TACC, TPACC applicable, respectively, at TDC signal-synchronous acceleration and post-acceleration, and the fuel decreasing constant TDEC applicable at TDC signal-synchronous engine deceleration control.

Figure 27:
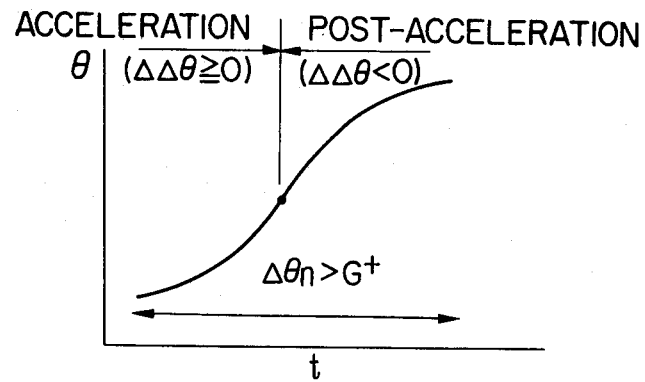
FIG. 27 is a view showing a curve of a twice-differentiated value $\Delta\Delta\theta$ of a throttle valve opening $\theta$, plotted with respect to time t and throttle valve opening $\theta$, based on the assumption that engine rpm Ne remains constant and throttle valve opening $\Delta\theta$ is larger than a predetermined value G+.

First, the value $\theta$n of the throttle valve opening is read into a memory in ECU 9 upon application of each TDC signal pulse to ECU 9 (step 1). Then, the value $\theta n-1$ of the throttle valve opening in the previous loop is read from the memory at the step 2, to determine whether or not the difference $\Delta\theta n$ between the value $\theta n$ and the value $\theta n-1$ is larger than a predetermined synchronous acceleration control determining value $G^+$, at the step 3. If the answer is yes at the step 3, the number of pulses nDEC stored in a deceleration ignoring counter, hereinafter referred to, is resetted to a predetermined number of pulses nDEC$\emptyset$ at the step 4. A further determination is made as to whether the difference $\Delta\Delta\theta n$ between the difference $\Delta\theta n$ in the present loop and the difference $\Delta\theta n-1$ in the previous loop is equal to or larger than zero, at the step 5. If the answer is yes, the engine is determined to be accelerating, and if the answer is no, it is determined to be in a post-acceleration state. The above differential value ΔΔθn, which is shown in FIG. 27, is equivalent to a value obtained by twice differentiating the throttle valve opening value θn. Whether the engine is accelerating or after acceleration is determined with reference to the point of contraflexure of the twice differentiated value curve and in dependence upon the direction of change of the throttle valve opening. When it is determined at the step 5 that the engine is accelerating, the number of post-acceleration fuel increasing pulses n2 corresponding to the variation Δθn is set into a post-acceleration counter as a count nPACC (step 6). FIG. 28a and FIG. 28b show tables showing, respectively, the relationship between the variation Δθn of the throttle valve opening and the acceleration fuel increasing constant TACC, and the relationship between the count nPACC and the post-acceleration fuel increasing constant TACC. By referring to FIG. 28a, a value TACCn of acceleration fuel increasing constant TACC is determined which corresponds to a variation Δθn. Then, by referring to FIG. 28b, a value TPACCn of post-acceleration fuel increasing constant TPACC is determined which corresponds to the value TACCn determined above, followed by determining the value of post-acceleration fuel increasing pulses n2 from the value TPACCn determined. That is, the larger the throttle valve opening variation Δθn, the larger the post-acceleration fuel increment is. Further, the larger the variation Δθn, the larger value the post-acceleration count nPACC is set to, so as to obtain a longer fuel increasing period of time.

Simultaneously with the above step 6, the value of acceleration fuel increasing constant TACC is determined from the table of FIG. 28a, which corresponds to the throttle valve opening variation Δθn (step 7). The TACC value thus determined is set into the aforementioned equation (3), and simultaneously the deceleration fuel decreasing constant TDEC is set to zero, at the step 8.

On the other hand, if the aforementioned ΔΔθn is found to be smaller than zero as a result of the determination of the step 5, it is determined whether or not the post-acceleration count nPACC is larger than zero, which was set at the step 6 (step 9). If the answer is affirmative, 1 is subtracted from the same count nPACC at the step 10, to calculate a post-acceleration fuel increment value TPACC from the table of FIG. 28b, which corresponds to the value nPACC-1 obtained above, at the step 11. The calculated value TPACC is set into the equation (3) as TACC and simultaneously the value of TDEC is set to zero at the step 8. When the post-acceleration count nPACC is found to be less than zero at the step 9, the values of TACC, TDEC are both set to zero at the step 12.

When the variation Δθn is found to be smaller than the predetermined value G+ as a result of the determination of the step 3, it is determined whether or not the same value Δθn is smaller than a predetermined synchronous deceleration determining value G-, at the step 13. If the answer is no, the computer judges that the engine is then cruising to have its program proceed to the aforementioned step 9. If the answer is yes, it is determined whether or not the deceleration is now being ignored, at the step 14. That is, even if the throttle valve opening variation Δθn is smaller than the predetermined value G-, the engine is not judged to be decelerating (that is, the deceleration is ignored) until the number of TDC signal pulses counted by the deceleration ignoring counter exceeds the predetermined pulse number nDEC∅ to which the counter is resetted at the aforementioned step 4. To be concrete, at the step 14 it is determined whether or not the pulse number nDEC in the deceleration ignoring counter, which is resetted to the initial value nDEC∅ at the step 4, is larger than zero (that is, usually engine deceleration can be ignored when it occurs immediately after engine acceleration). If the pulse number nDEC is larger than zero, 1 is subtracted from the pulse number nDEC at the step 15, and the program moves to the aforementioned step 9. If the pulse number nDEC is found to be zero or less, the post-acceleration count nPACC is set to zero at the step 16 and the value of the deceleration fuel decreasing constant TDEC is calculated at the step 17. The value of the constant TDEC is calculated from the following equation:

$$TDEC = CDEC \times \Delta\theta \qquad (10)$$

where CDEC is a deceleration fuel decreasing coefficient and set within a range from 0 to 12.5 ms per one degree of the throttle valve opening, for instance. The value of the fuel decreasing constant TDEC thus calculated is set into the basic equation (3) and simultaneously the value of TACC is set to zero at the step 18.

Incidentally, in the above subroutine, when the engine is found to be accelerating at the step 5, the value TPACC in the previous loop is cancelled. But, the larger one of the values TPACC and TACC may be used in the present loop. Further, in the case where deceleration, cruising and deceleration occur in this order after the value nDEC has been resetted to nDEC∅ at the step 4 at engine acceleration so that the deceleration ignoring pulse number nDEC, which is reduced by 1 each time one TDC signal pulse is inputted as mentioned above, is reduced to zero during the first deceleration, the pulse number nDEC remains zero at initiation of the second deceleration since the number nDEC is not resetted to nDEC∅. Therefore, in such case the second deceleration is not ignored at all and deceleration fuel decrease is effected immediately upon initiation of the second deceleration.

Figure 29:
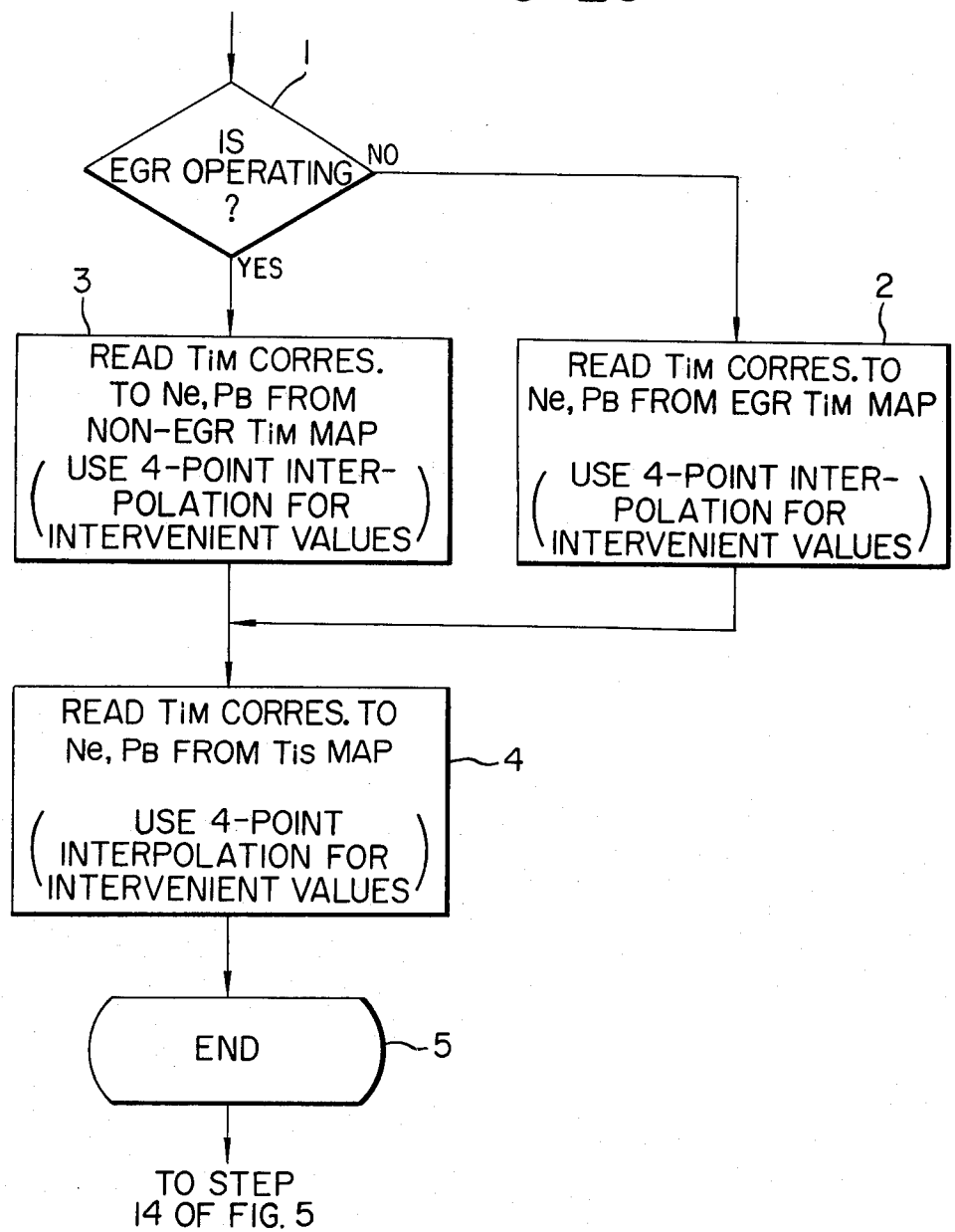
FIG. 29 is a flow chart showing a subroutine for calculation of basic values TiM, TiS of the valve opening periods of the main injectors and the subinjector.

Subroutine for Calculating Basic Valve Opening Periods TiM, TiS for Main Injectors and Subinjector:

FIG. 29 shows a flow chart of a subroutine for calculating the values of the valve opening periods TiM, TiS, respectively, for the main injectors and the subinjector. Two maps are provided for control of the main injectors, which are selectively used depending upon whether the engine is in EGR operation or in non-EGR operation, hereinafter referred to.

Figure 31A:
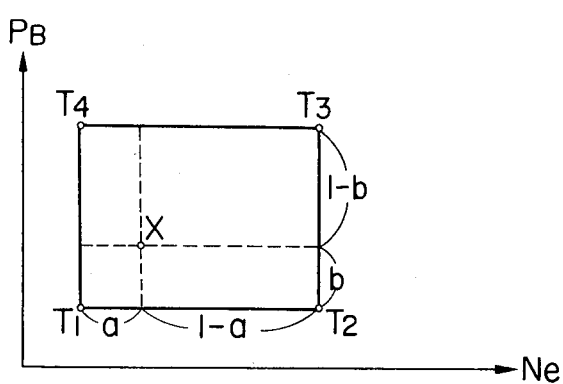
Figure 31B:
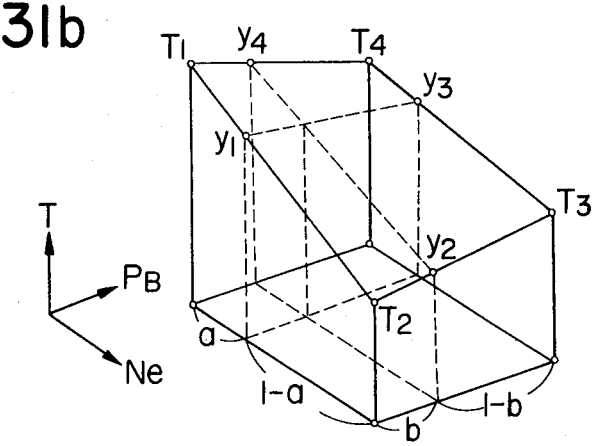
FIG. 31b is a graph for calculation of a desired TiM value from a value measured by the graph of FIG. 31a by means of 4-point interpolation.

First, it is determined by means of an EGR operation determining subroutine whether or not the engine is in EGR operation, at the step 1. If the answer is no, a value of the basic valve opening period TiM is selected from the non-EGR operation TiM map, which corresponds to the actual engine rpm Ne and the actual absolute pressure PB. The non-EGR operation TiM map is shown in FIG. 30a. According to the map, there are provided 16 steps of different predetermined absolute pressure values PB1-16 which are set within a range of 1100-140 mmHg, and 16 steps of different predetermined engine rpm values N1-16 which are set within a range of 0-6000 rpm. When the engine rpm Ne and/or the absolute pressure PB has values intervening between adjacent ones of the values N1-16 and/or PB1-16, the TiM value is determined by a four-point interpolation method (step 2). FIGS. 31a and 31b show the manner of calculating the value of TiM in the case where Ne and PB have such intervenient values, respectively. The following equation is applied to the case where interpolation calculation based upon PB follows that based upon Ne:

$$y1=(1-a)T1+aT2, y3=(1-a)T4+aT3,$$
$$T=(1-b)y1+by3=(1-a)(1-b)T1+a(1-b)T2+abT3+(1-a)bT4 \quad (11)$$

The same results can be obtained also by carrying out the interpolation based upon Ne after the interpolation based upon PB.

If the answer to the question of the step 1 in FIG. 29 is affirmative, the value of TiM is selected from the EGR operation TiM map (step 3). This EGR operation TiM map is shown in FIG. 30b and has smaller ranges of engine rpm and absolute pressure than those of the non-EGR operation TiM map. The predetermined engine rpm values comprise ten steps, i.e., N1-10 and the predetermined absolute pressure ten steps, i.e., PB6-15, respectively.

After the selection of the value of TiM at the step 2 or 3 of FIG. 29, the value of TiS is selected from a TiS map in a manner similar to the above, at the step 4. FIG. 30c shows the TiS map which has the same predetermined value ranges and steps of Ne and PB as those of the above non-EGR operation TiM map. Also in the EGR operation TiM map and the TiS map, similar interpolations to that of the non-EGR operation are carried out when the value Ne and/or the value PB has an intervenient value. Further, throughout FIGS. 30a-30c, Ni and PBj carrying identical numerals have the same predetermined values.

After the values of TiM, TiS have been determined in the above manner (step 5), the program proceeds to the step 14 of the subroutine of FIG. 5 for calculation of the valve opening periods TOUTM, TOUTS for the main injectors and the subinjector.

Figure 32A:
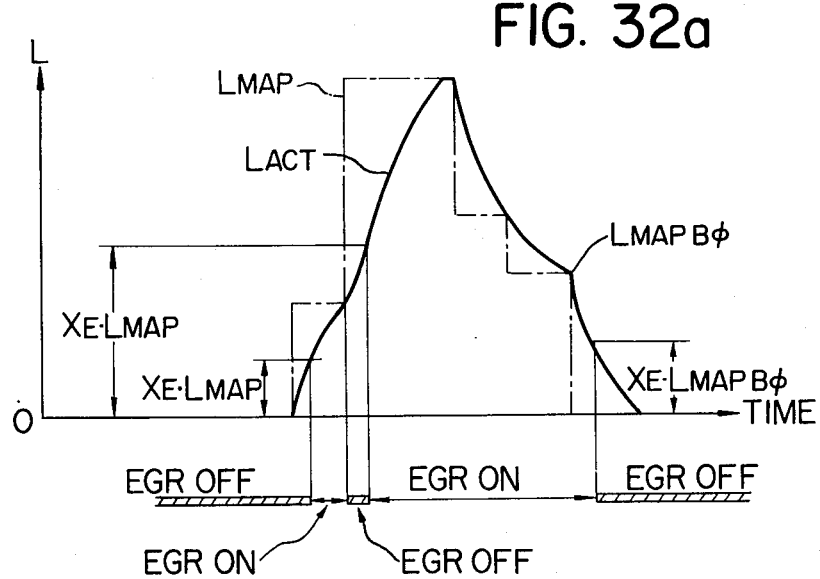
FIG. 32a is a graph showing the relationship between actual lift LACT of the valve body of the exhaust gas recirculation valve and lift command value LMAP.
Figure 32B:
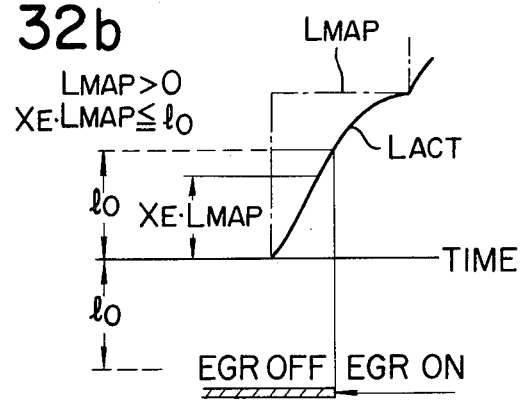
FIG. 32b is a graph applicable during opening of the exhaust gas recirculation valve and showing an EGR operation determining method applicable when actual lift LACT of the valve body of the exhaust gas recirculation valve has a value close to an insensitive zone defining value l0.
Figure 32C:
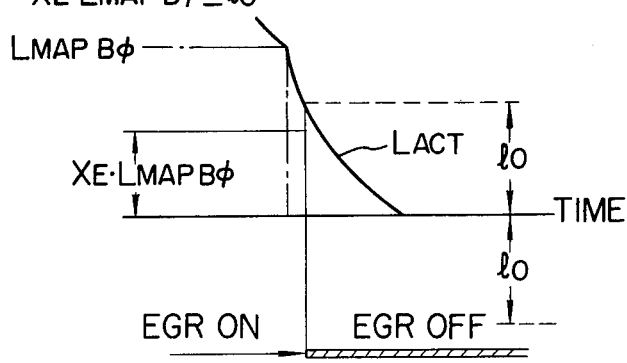
FIG. 32c is a view similar to FIG. 32b and applicable during closing of the exhaust gas recirculation valve.

EGR Operation Determining Program:

The determination as to whether the EGR operation or the non-EGR operation is being carried out is made with reference to asynchronous pulses which are each generated every 10 ms for instance but not in synchronism with the TDC signal. And this determination is made on the basis of the difference 1 between the actual lift LACT of the valve body 53 of the exhaust gas recirculation valve 49 in FIG. 1 and a valve lift command value LMAP selected depending upon the engine rpm Ne and the absolute pressure PB. FIG. 32a is a graph for comparison between the actual lift LACT and the lift command value LMAP with respect to time. The EGR valve body moves in a streamline manner and does not completely follow the valve lift command having its value changing in a steplike manner, with some response lag. In view of this, a value XE×LMAP is first obtained by multiplying each lift command value LMAP by a predetermined coefficient XE corresponding to the response lag, and then the actual lift LACT is compared with this value XE×LMAP to determine whether the engine is in EGR operation or in non-EGR operation.

FIG. 33 shows a flow chart of the EGR operation determining program which corresponds to the step 1 of the TiM, TiS selecting subroutine shown in FIG. 29. First, a lift command value LMAP is selected, which corresponds to the actual engine rpm Ne and the absolute pressure PB. A map of the lift command value LMAP is shown in FIG. 34, where 10 steps of different predetermined values PB6-15 of the absolute pressure PB are provided which are set within a range of 204-780 mmHg for instance, and 10 steps of different predetermined values N1-10 of the engine rpm Ne set within a range of 0-4000 rpm for instance. This map setting is identical with that of the EGR operation TiM map. A lift command value LMAP is determined from this LMAP map. Regarding Ne and PB values intervening between the adjacent steps, the four-point interpolation method is used, as shown in FIG. 31a. Reverting to FIG. 33, it is determined whether or not the lift command value LMAP thus determined is larger than zero at the step 1. If the answer is yes, whether or not the product LMAP×XE of the lift command value LMAP and the coefficient XE (e.g. 0.5) is larger than an insensitive zone defining value 10 is determined at the step 2. This insensitive zone defining value 10 is a value such that if the error 1 of the actual lift of the exhaust gas recirculation valve with respect to a desired value (lift command value) LMAP is within a range defined by the insensitive zone defining value 10, i.e. the relationship of $+10>1>-10$ stands, the actual lift LACT can be regarded as equal to the lift command value LMAP. The insensitive zone defining value is set at a suitable value for preventing hunting of the valve body and obtaining improved accuracy of the EGR control. If the answer to the question of the step 2 is yes, whether or not the actual lift LACT is larger than the value LMAP×XE is determined at the step 3. If the answer is yes, it is regarded that the EGR operation is being effected, while if the answer is no, the EGR operation is regarded as being at rest. If the answer is no as a result of the determination at the step 2, whether or not the actual lift LACT is larger than the insensitive zone defining value 10 is determined at the step 4. If the answer is yes, the engine is regarded as being during EGR operation, and if the answer is no, during non-EGR operation, respectively (refer to FIG. 32b).

On the other hand, if the determination at the step 1 shows that the lift command value is not larger than zero, i.e. equal to zero, it is further determined whether or not the lift command value was equal to zero in the previous loop and also whether or not a value of TiM was once selected from the non-EGR operation TiM map in the previous loop at the step 5. If the answer is yes, the engine is regarded as being during non-EGR operation. If the answer is no, it is determined at the step 6 whether or not the product LMAPB0×XE of a lift map value LMAPB0 occurring before the lift command map LMAP becomes zero and the coefficient XE is larger than the insensitive zone defining value 10. If the answer is yes, it is determined whether or not the actual lift LACT is larger than the product LMAPB0×XE, at the step 7. If the answer is yes, the engine is regarded as being during EGR operation, and if the answer is no, during non-EGR operation, respectively (refer to FIG. 32c). Further, if the determination at the above step 6 gives a negative answer, whether or not the actual lift LACT is larger than the insensitive zone defining value 10 is determined at the step 8. If the answer is yes, the engine is regarded as being during EGR operation, and if the answer is no, during non-EGR operation, respectively.

Figure 35:
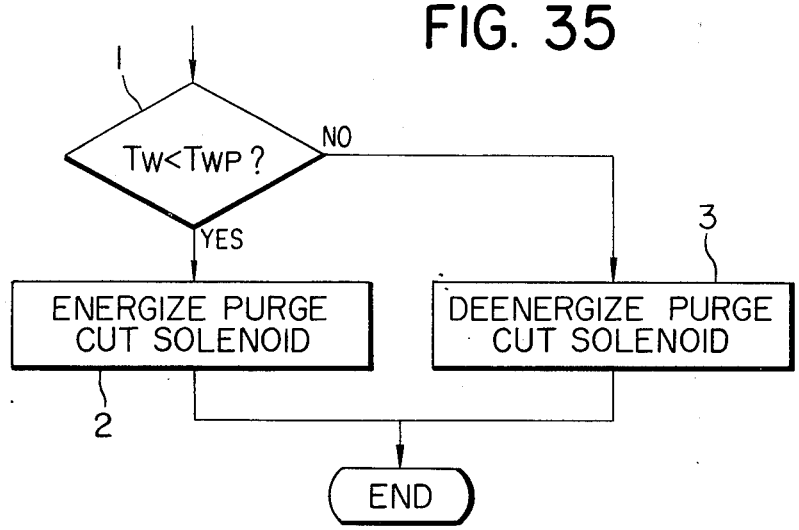
FIG. 35 is a flow chart showing a program for control of the purge cut valve in FIG. 1.

Purge Cut Valve Control Program:

Control of the purge cut valve 26 for control supply of absorbed fuel from the canister 20 to the engine intake pipe 4, all the elements shown in FIG. 1, is effected depending upon determination as to whether or not the engine cooling water temperature TW is higher than a predetermined value TWP. FIG. 35 shows a flow chart of the control program for the purge cut valve 26. It is first determined at the step 1 whether or not the engine water temperature TW is lower than a predetermined purge cut-determining water temperature (e.g. 70° C.). If the answer is yes, energization of the solenoid 34 of the purge cut valve 26 is effected at the step 2, to open the valve 26 for purge cut operation. If the answer is no, the solenoid 34 of the purge cut valve 26 is deenergized at the step 3 to close the valve 26 for interruption of the purge cut operation. The above predetermined value TWP is set at a value within a range of −30° C.−+90° C., for instance.

Figure 36:
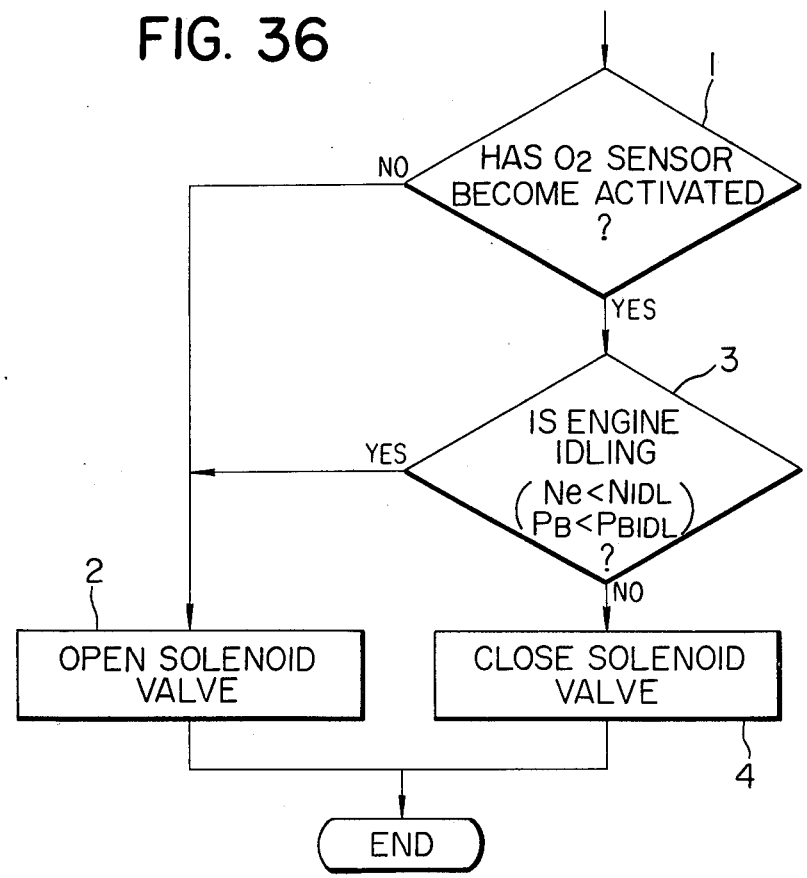
FIG. 36 is a flow chart showing a program for control of the solenoid valve in FIG. 1.

Secondary Air Supply Valve Control Program:

As previously noted, the secondary air supply valve 68 appearing in FIG. 1 is controlled by opening and closing the solenoid valve 75. This solenoid valve 75 is opened on condition that the $O_2$ sensor 82 is an inactivated state or the engine is at idle. FIG. 36 shows a flow chart of the control program for the solenoid valve 75. It is first determined whether or not the $O_2$ sensor has become activated at the step 1. This step 1 is identical with the step 1 in FIG. 20. If the answer is no, the solenoid valve 75 has its solenoid 79 energized to open to allow the absolute pressure in the intake pipe to be introduced into the negative pressure 73 to cause opening of the secondary air supply valve 68 for introduction of secondary air into the exhaust pipe of the engine (step 2). If the answer to the question of the question of the step 1 is affirmative, whether or not the engine is at idle is determined at the step 3. Also this step is identical with the step 4 in FIG. 20. If the answer to the above determination is yes, the program proceeds to the above step 2, while if the answer is no, the solenoid 79 of the solenoid valve 75 is deenergized to interrupt the introduction of secondary air into the exhaust pipe at the step 4.

TDC Signal-Asynchronous Control

The system of the present invention employs asynchronous valve opening period control which controls the main injectors not in synchronism with the TDC signal but with a pulse train having a constant pulse separation, in addition to the aforementioned TDC signal-synchronous valve opening period control for the main injectors and the subinjector. The asynchronous valve opening period control will now be described. As previously stated, the valve opening period TMA of the main injectors according to the asynchronous control is calculated from the following equation:

$$TMA = TiA \times KTWT + (TV + \Delta TV) \quad (12)$$

The above asynchronous control is intended to make up for a shortage in the acceleration fuel increment synchronous with the TDC signal which is applied at rapid acceleration or the like.

Figure 38:
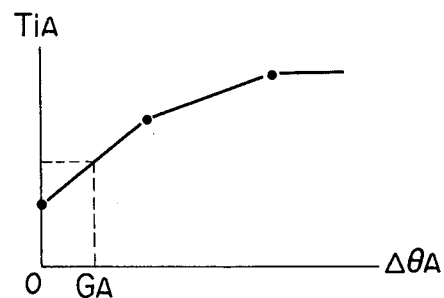
FIG. 38 is a view showing a table of the relationship 4 between throttle valve opening variation $\Delta\theta A$ and basic fuel increasing constant TiA applicable at TDC signal-asynchronous acceleration.
Figure 37:
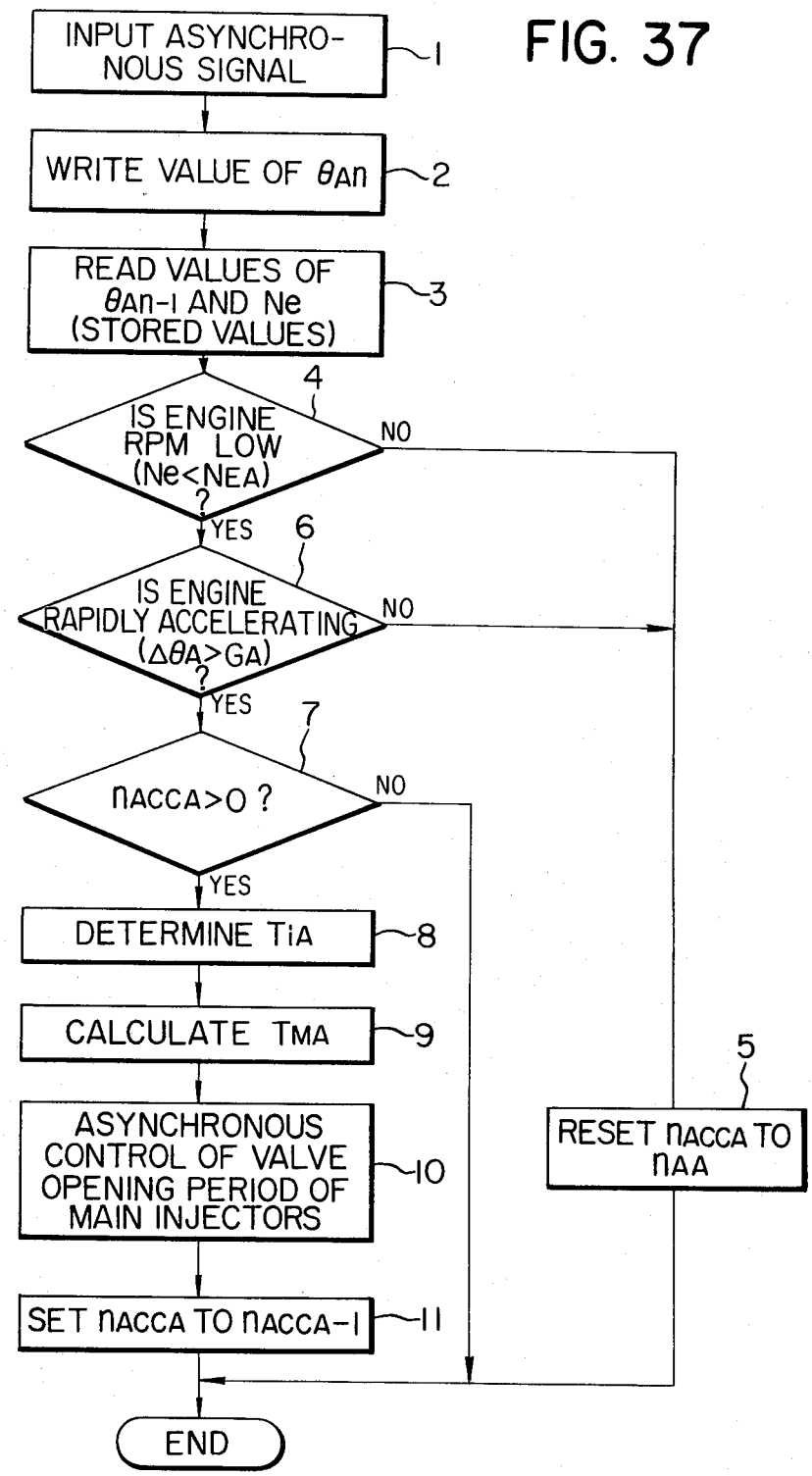
FIG. 37 is a flow chart showing a subroutine for acceleration in asynchronism with TDC signal.

Asynchronous Acceleration Control Subroutine:

FIG. 37 shows a flow chart of a subroutine for carrying out the asynchronous acceleration control. First, asynchronous signal pulses are inputted to an associated counter in ECU 9 at constant intervals (e.g. every 20 ms), independently of the TDC signal pulses (step 1). The pulse separation of this asynchronous signal may be set at a value within a range of 10-50 ms. Then, each time one pulse of the asynchronous signal is inputted, the value $\theta An$ of the throttle valve opening is written into an associated register in ECU 9, at the step 2. The throttle valve opening value $\theta An-1$ and the engine rpm Ne value which were stored in ECU upon inputting of the previous pulse are read from their respective registers in ECU, at the step 3. Then, the engine rpm Ne value thus read out is compared with a predetermined asynchronous acceleration control determining rpm NEA (e.g. 2800 rpm) at the step 4. The predetermined rpm NEA is set at a value within a range of 50-6000 rpm, for instance. If the answer to the above comparison is no, a pulse number nACCA stored in its register is resetted to its initial value nAA (e.g. 2) at the step 5. If the answer to the question of the step 4 is yes, whether or not the difference between the two values $\theta An$ and $\theta An-1$ of the throttle valve opening, that is, the variation $\Delta \theta A$ is larger than a predetermined value GA (e.g. 20°/sec) at the step 6. If the answer is negative, the program proceeds to the above step 5. If the answer is affirmative, it is determined at the step 7 whether or not the stored pulse number nACCA is larger than zero and simultaneously the asynchronous acceleration control fuel increment TiA is determined from the table of FIG. 38, at the step 8. FIG. 38 shows a graph of the relationship between the variation $\Delta \theta A$ of the throttle valve opening and the asynchronous acceleration control fuel increment TiA, from which the value of TiA is determined. Following the determination of TiA, the value of the valve opening period TMA for the main injectors is calculated from the aforementioned equation (12) at the step 9. In the equation (12), the coefficient KTWT and the constants TV, $\Delta TV$ are renewed upon inputting of each TDC signal pulse to ECU, as previously mentioned. The valve opening period of the main injectors is conrtrolled in accordance with the value of TMA calculated at the step 10. While the above steps 7-10 are carried out, 1 is subtracted from the aforementioned pulse number nACCA upon inputting of each pulse of the asynchronous signal at the step 11, and the above asynchronous control of the valve opening period is continued until the pulse number nACCA becomes zero to provide the negative answer to the question of the step 7.

Incidentally, when the asynchronous control is effected concurrently with the synchronous control, the valve opening period is calculated preferentially by means of the synchronous control. To be concrete, in such event, the arithmetic calculation of the valve opening period in CPU 100 is first made by means of the synchronous control, followed by that by means of the asynchronous control, and after this the outputs of the respective counters (the counters 104-107 and the counter 108 in FIG. 3) are summed up. But, the values of the voltage-dependent correction constants TV, $\Delta TV$ should not be included in both of the two outputs, that is, should be added in only one of the outputs.

Figure 39A:
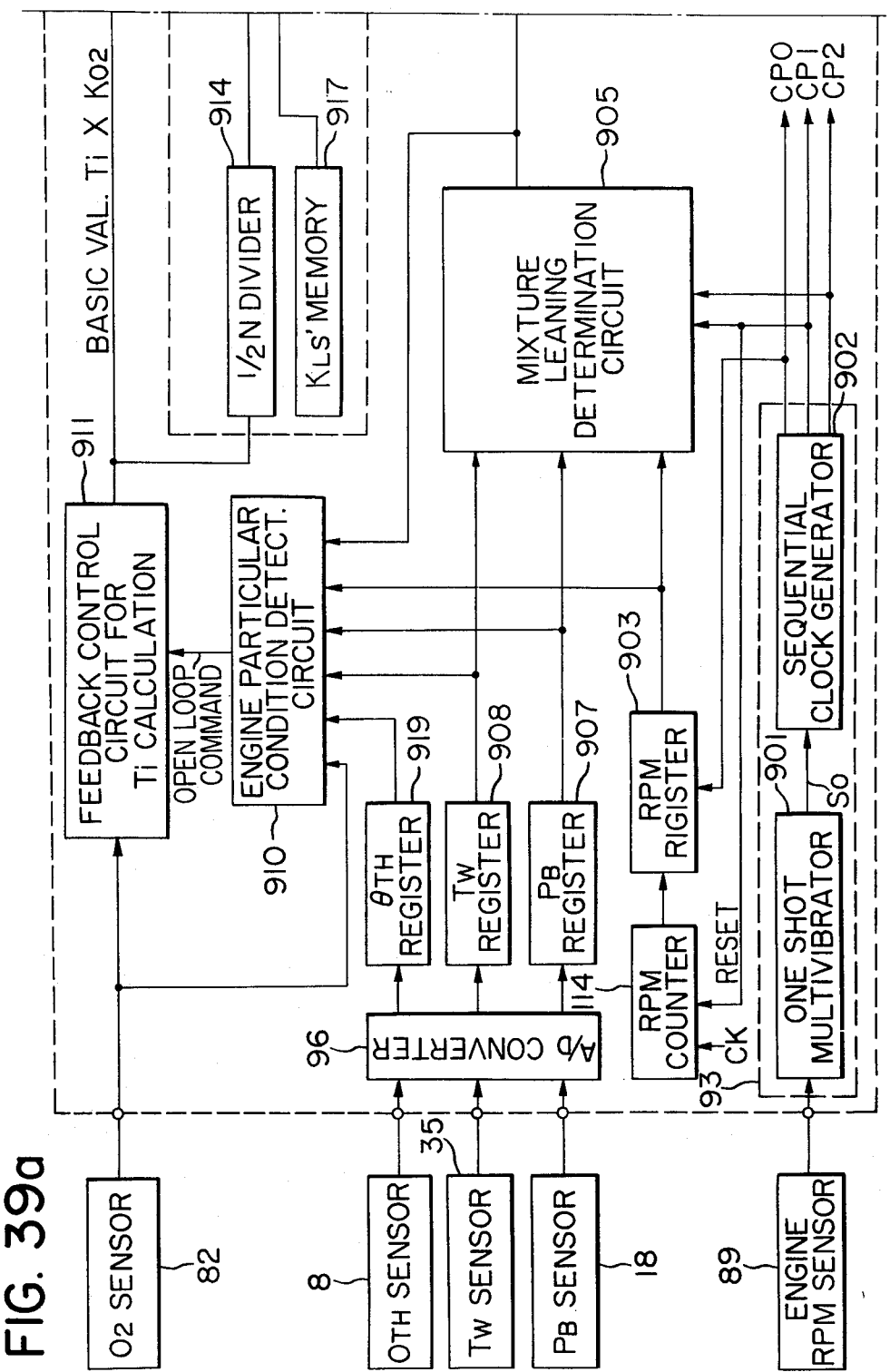
Figure 40:
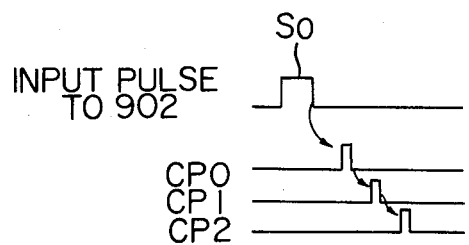
FIG. 40 is a timing chart showing the relationship between a TDC signal inputted to the waveform shaper circuit 93 appearing in FIG. 3 and clock pulses outputted therefrom.

FIG. 39 illustrates a block diagram mainly showing the lean-stoich. operation control section in ECU 9 of the fuel supply control system of the invention. The TDC signal picked up by the engine rpm sensor 89 appearing in FIG. 1 is applied to a one shot multivibrator 901 which forms the waveform shaper circuit 93 in FIG. 3 in cooperation with a sequential clock generator circuit 902 arranged adjacent thereto. The one shot multivibrator 901 generates an output signal S0 upon application of each TDC signal pulse thereto, which signal actuates the sequential clock generator circuit 902 to generate clock pulses CP0-2 in a sequential manner. FIG. 40 shows a timing chart of the output clock pulses of the sequential clock generator circuit 902. It is noted from FIG. 40 that clock pulses CP0-2 are sequentially generated upon inputting of the output pulse S0 of the one shot multivibrator 901 to the circuit 902. The clock pulse CP0 is supplied to an rpm register 903 to cause same to store a count outputted from an rpm counter 114 which counts reference clock pulses. The clock pulse CP1 is applied to the rpm counter 114 to reset the count in the counter 114 to zero. Therefore, the engine rpm Ne is measured in the form of the number of reference clock pulses counted between two adjacent pulses of the TDC signal, and the counted reference clock pulse number or measured engine rpm NE is stored in the above rpm register 903. Further, the clock signal CP1 is applied to a mixture leaning operation-determining circuit 905, hereinafter referred to, which is also supplied with the clock pulse CP2.

In a manner parallel with the above operation, output signals of the absolute pressure sensor 18, the engine water temperature sensor 35 and the throttle valve opening sensor 8 are supplied to the A/D converter unit 96 to be converted into respective digital signals which are in turn applied to an absolute pressure register 907, an engine water temperature register 908 and a throttle valve opening register 909, respectively. The values stored in the above registers are supplied to an engine particular operation detecting circuit 910, the values of the absolute pressure register 907 and the engine water temperature register 908 being also supplied to the aforementioned mixture leaning operation-determining circuit 905.

In a manner parallel with the above operations, the output signal of the O$_2$ sensor 82 is supplied to the engine particular operation detecting circuit 910 as well as to a feedback control circuit 911 for calculation of the basic valve opening value Ti for the main injectors. This feedback control circuit 911 is adapted to perform arithmetic calculation of the basic value Ti and the value of coefficient KO$_2$ on the basis of the output signals of the associated sensors as well as feedback control operation using the resulting calculated values. The above engine particular condition detecting circuit 910 is responsive to the output signals of the engine rpm register 903 and the mixture leaning operation-determining circuit 905 as well as the other aforementioned input signals to detect engine particular operating conditions involving lean-stoich. operation, idle, deceleration, fuel cut and wide-open-throttle. When one of these particular conditions is fulfilled, the circuit 910 supplies an open loop command to the feedback control circuit 911. For instance, when the water temperature TW is higher than 70° C., the absolute pressure PB is lower than 505 mmHg (at initiation of the lean-stoich. operation) or 515 mmHg (at termination of the same operation), and the engine rpm Ne is higher than 1200 rpm (at initiation of the lean-stoich. operation) or 1100 rpm (at termination of the same operation) at the same time, the circuit 910 judges the lean-stoich. operation condition to be fulfilled and then supplies an open loop command to the feedback control circuit 911. In other words, an open loop command is issued when one of the open loop control conditions is fulfilled which are involved in the subroutine for calculation of "O$_2$ feedback control" correction coefficient KO$_2$ shown in FIG. 20. A product of the basic value Ti and the coefficient KO$_2$ for control of the valve opening period of the main injectors calculated by the feedback control circuit 911 is supplied to an adder circuit 912 and a mixture leaning fuel decrement-calculating circuit 913, both hereinlater referred to.

As previously noted, to lean the mixture during the lean-stoich. operation the product Ti×KO$_2$ is multiplied by the value 0.8 of the leaning coefficient KLS. The mixture leaning fuel decrement-calculating circuit 913 carries out this multiplication in integers. More specifically, to obtain a product of Ti×KO$_2$×0.8, an algebraic expression Ti×KO$_2$−(Ti×KO$_2$×$\frac{1}{2}^N$)×K is used. By setting N at 6 and K at 13, for instance, calculation of Ti×KO$_2$×0.2 is substantially carried out, and the resulting product is subjected to calculation by means of complements at a two's complement circuit 916, hereinlater referred to.

Figure 41:
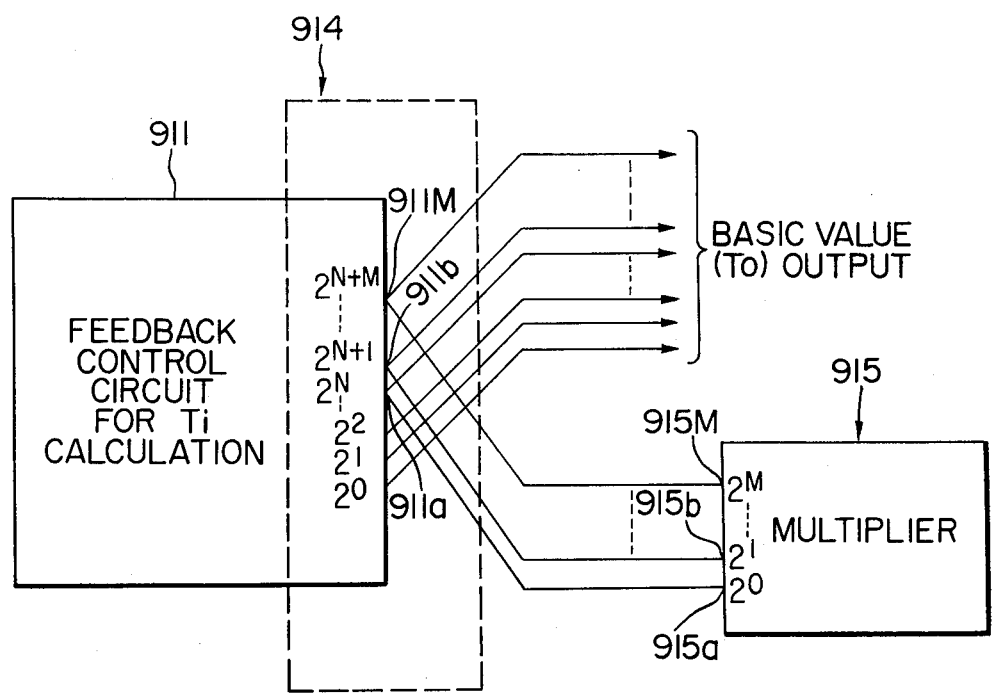
FIG. 41 is a view illustrating in detail a $\frac{1}{2}^N$ division circuit appearing in FIG. 39.

In the $\frac{1}{2}^N$ divider circuit 914 of the mixture leaning fuel decrement-calculating circuit 913, arithmetic calculation is carried out according to the above algebraic expression Ti×KO$_2$×$\frac{1}{2}^N$. FIG. 41 shows details of the $\frac{1}{2}^N$ divider circuit 914. Of the binary output terminals of the feedback control circuit 911, the terminal 911a for figures in the $2^N$ place is connected to an input terminal 915a for figures in the $2^0$ place of a multiplier circuit 915, the terminal 911b for the $2^{N+1}$ place to the input terminal 915b for the $2^1$ place, and the terminal 911M for the $2^{N+M}$ place to the terminal 915M for the $2^M$ place, respectively, for effecting the calculation of Ti×KO$_2$×$\frac{1}{2}^N$. Thus, a multiplicand thus obtained is supplied into the interior of the multiplier circuit 915. This circuit 915 is simultaneously supplied with a constant K equal to 13 from a KLS' memory 917 to multiply the multiplicand by 13. The predetermined number 13 is suited to obtain the value 0.8 of leaning coefficient KLS in conjunction with the term $\frac{1}{2}^6$. Then, the resulting product Ti×KO$_2$×$\frac{1}{2}^6$×13 is applied to the two's complement circuit 916 to obtain a two's complement of the product Ti×KO$_2$×$\frac{1}{2}^N$×13 which is applied to an AND circuit 918. The AND circuit 918 allows supply of the above two's complement to the aforementioned adder circuit 912 as long as it is supplied with a flag signal from the mixture leaning operation-determining circuit 905 which generates the above flag signal during fulfillment of the mixture leaning condition. The adder circuit 912 adds this two's complement to the product Ti×KO$_2$ supplied from the feedback control circuit 911 to obtain a basic value T0UT' which corresponds to a product of the basic value Ti and the coefficients KO$_2$, KLS, and apply same to a register 919. The T0UT' value in the register 919 is supplied to a T0UT value control circuit 920 which performs arithmetic operation using the aforementioned basic equation by adding to and/or multiplying the value T0UT' by the aforementioned other correction coefficients and constants, results of which are supplied to the main injectors as driving outputs.

Figure 42:
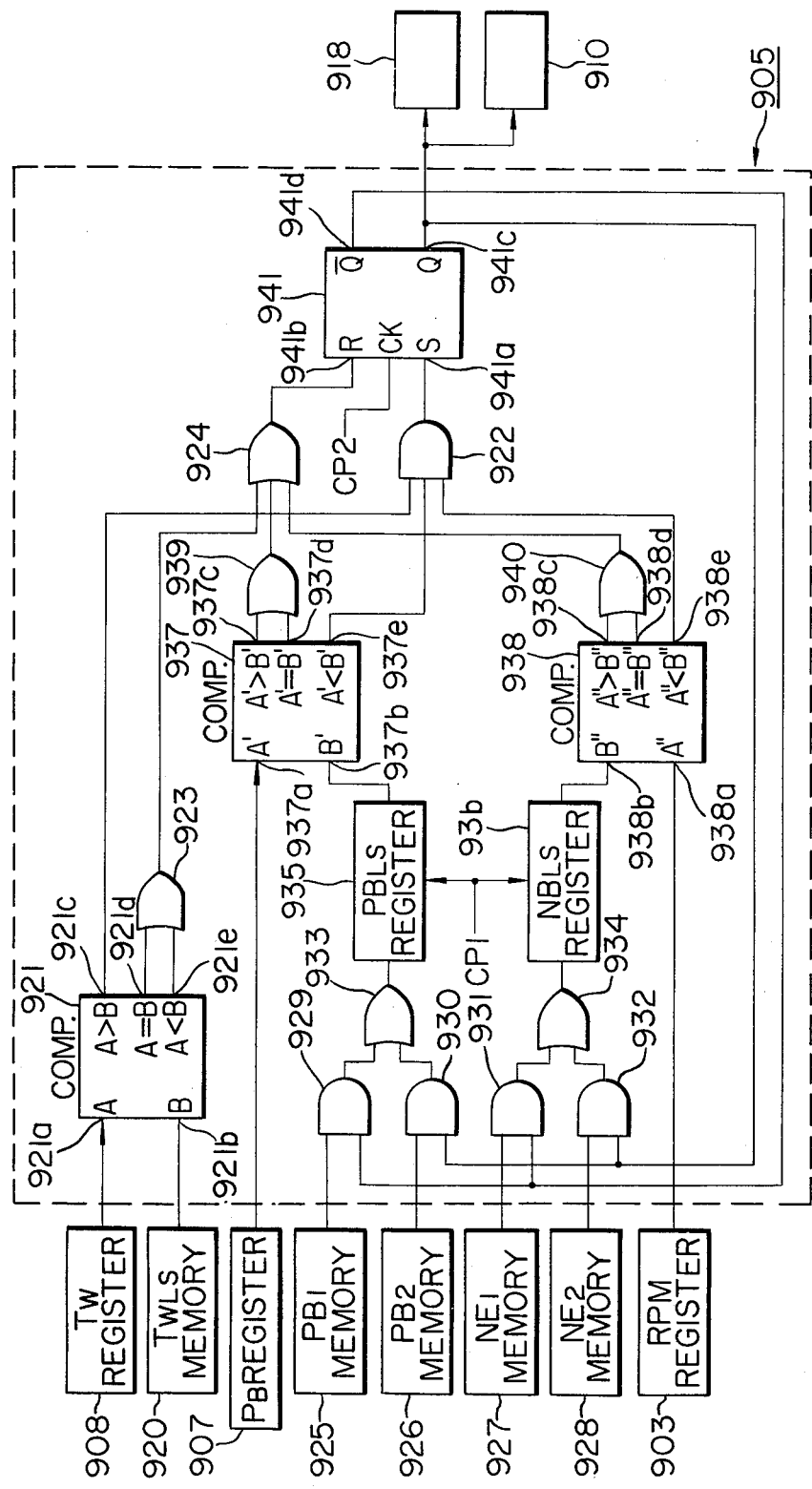
FIG. 42 is a block diagram illustrating a mixture-leaning operation determining circuit.

FIG. 42 is a block diagram illustrating the interior of the mixture leaning operation-determining circuit 905. A water temperature signal A detected by the engine water temperature sensor 35 and stored in the water temperature register 908 and a signal B indicative of a predetermined lean-stoich. operation-determining water temperature TWLS and stored in a TWLS memory 920 are supplied to the input terminals 921a and 921b of a comparator 921, respectively. The comparator 921 has an output terminal 921c adapted to generate an output when the input relationship of A>B stands and directly connected to one input terminal of an AND circuit 922. The comparator 921 has further output terminals 921d, 921e adapted to generate outputs, respectively, when the input relationships of A=B and A<B stand, and connected to the input of an OR circuit 923. The OR circuit 923 in turn has its output connected to one input terminal of another OR circuit 924.

On the other hand, a PB1 memory 925 is provided which has a predetermined absolute pressure value PB1 stored therein which is applied when the engine enters into the lean-stoich. operation and defines the lean-stoich. operation region shown in FIG. 24, while a PB2 memory 926 stores a predetermined absolute pressure value PB2 applicable when the engine is released from the lean-stoich. operation. An NE1 memory 927 stores a predetermined rpm value NE1 applicable at entrance into the lean-stoich. operation, and an NE2 memory 928 a predetermined rpm value NE2 applicable at termination of the lean-stoich. operation, respectively. These memories are connected, respectively, to the input terminals of AND circuits 929, 930, 931, 932. The AND circuits 929, 930, which are supplied, respectively, with the PB1 and PB2 values, are connected to the input of an OR circuit 933, while the AND circuits 931, 932, which are supplied, respectively, with the NE1 , NE2 values, are connected to the input of another OR circuit 934. The OR circuits 933, 934 have their outputs connected, respectively, to the inputs of a PBLS register 935 and an NELS register 936. The PBLS register 935 has its output connected to an input terminal 937b of a comparator 937, while the NELS register 936 has its output connected to an input terminal 938b of a comparator 938. The comparator 937 has another input terminal 937a connected to the aforementioned PB register 907 to be supplied with an absolute pressure PB signal A' therefrom. The comparator 938 has another input terminal 938a connected to the rpm register 903 to be supplied with a 1/Ne value signal A" indicative of a reciprocal of engine rpm Ne. The comparator 937 has an output terminal 937c for generating an output when the input relationship of A'>B' stands and another output terminal 937d for generating an output when the input relationship of A'=B' stands, which terminals are connected to the respective input terminals of an OR circuit 939. The comparator 937 has a further output terminal 937e adapted to generate an output on condition that the input A' is smaller than the input B' and connected to one input terminal of the AND circuit 922. The comparator 938 has output terminals 938c, 938d adapted to produce outputs on condition that the input A" is larger than the input B" and the former is equal to the latter, respectively, and connected to the respective input terminals of an OR circuit 940. Another output terminal 938c of the comparator 938 adapted to generate an output when the input A" is smaller than the input B" is connected to another input terminal of the AND circuit 922. The OR circuits 939, 940 have their outputs connected to the input of the OR circuit 924. The output of the above AND circuit 922 is connected to the set pulse input terminal 941a of a flip flop circuit 941, while the output of the OR circuit 924 is connected to the reset pulse input terminal 941b of the flip flop circuit 941. The flip flop circuit 941 has its Q-output terminal 941c connected to one input terminal of the AND circuit 918 appearing in FIG. 39, and also to the other input terminals of the respective AND circuits 930, 932 which input terminals are supplied with the absolute pressure PB2 signal and the engine rpm NE2 signal applicable at termination of the lean-stoich. operation, respectively. Further, the above Q-output terminal 941c of the flip flop circuit 941 is connected to one input terminal of the engine particular operating condition detecting circuit 910, and the $\overline{Q}$-output terminal 941d of the same circuit 941 to the respective other input terminals of the AND circuits 929, 931 which input terminals are supplied with the absolute pressure PB1 signal and the engine rpm NE1 signal applicable at entrance into the lean-stoich. operation, respectively.

The operation of the mixture leaning operation-determining circuit 905 constructed above will now be explained.

Entrance into Lean-Stoich. Operation:

When the condition of lean-stoich. operation is not fulfilled, the flip flop circuit 941 generates an output of 1 through its $\overline{Q}$-output terminal 941d as mentioned later. This output of 1 is applied to the aforementioned other input terminal of the AND circuit 929 which has its one input terminal permanently supplied with the output of the PB1 memory 925. The AND circuit 929 accordingly generates the leaning determining absolute pressure PB1 signal applicable at entrance into the lean-stoich. operation. At the same time, also the AND circuit 931, which is connected to the $\overline{Q}$-output terminal of the flip flop circuit 941, generates the leaning determining rpm NE1 signal applicable at entrance into the lean-stoich. operation. These outputs of the AND circuits 929, 931 are applied, respectively, to the PBLS register 935 and the NELS register 936 through the respective OR circuits 933, 934 and stored in these registers upon inputting of each clock pulse CP1 thereto. These stored value signals are read into the input terminals 937b, 938b of the respective comparators 937, 938, as signals B', B", respectively. The comparators 937, 938 have their other input terminals 937a, 938a supplied, respectively, with a signal A' indicative of the actual absolute pressure PB and a signal A" indicative of the actual engine rpm Ne, and compare the signal A' with the signal B' and the signal A" with the signal B", respectively. In the comparator 937, when the input signal A' is larger in value than or equal to the input signal B', an output of 1 is outputted at its output terminal 937c or 937d and applied to the OR circuit 924 through the OR circuit 939. In the comparator 938, when the input signal A" indicative of 1/Ne is larger in value than or equal to the input signal B", an output of 1 is generated at its output terminal 938c or 938d and applied to the OR circuit 924 through the OR circuit 940. Also in the comparator 921, comparison is likewise made between an input signal A indicative of the engine water temperature TW and an input signal B indicative of the lean-stoich. operation-determining water temperature TWLS, and an output of 1 is applied to the OR circuit 924 through the OR circuit 923 when the relationship of A<B or A=B stands.

When supplied with any one of the outputs of the comparators 921, 937, 938, the OR circuit 924 outputs and applies an output of 1 to the reset pulse input terminal 941b of the flip flop circuit 941 to reset the same circuit upon inputting of a clock signal CP2 of the sequential clock generator circuit 902 in FIG. 39 thereto, to cause it to generate an output of 0 at its Q-output terminal 941c. This means that the output of the mixture leaning operation-determining circuit 905 then goes low to trigger the Ti-calculating feedback control operation.

When the condition of lean-stoich. operation is fulfilled, the relationship of A>B stands in the comparator 921 and the relationships of A'<B' and A"<B" stand in the comparators 937, 938, respectively, so that all the comparators 921, 937 and 938 generate outputs of 1, which are applied to the AND circuit 922 to cause same to apply an output of 1 to the set pulse input terminal 941*a* of the flip flop circuit 941 which in turn generates an output of 1 at its Q-output terminal 941*c* upon being supplied with a clock signal CP2. This output of 1 is supplied as a flag signal to the engine particular condition detecting circuit 910 to cause same to supply an open loop command to the Ti-calculating feedback control circuit 911 for open-loop mixture leaning operation.

Termination of the Lean-Stoich. Operation:

As stated above, during the open-loop mixture leaning operation the flip flop circuit 941 generates an output of 1 at its Q-output terminal 941*c*, which is applied to the respective one input terminals of the AND circuits 930, 932. Then, in the same manner as mentioned above, the leaning determining absolute pressure PB2 signal and the leaning determining rpm NE2 signal applicable at termination of the lean-stoich. operation are outputted, respectively, from the PB2 memory 926 and the NE2 memory 928 and applied to the respective registers 935, 936 through the respective OR circuits 933, 934 and stored in the registers upon inputting of a clock pulse CP1 thereto. The stored value signals are applied to the input terminals B', B" of the respective comparators 937, 938 for comparison with the actual absolute pressure PB and the actual engine rpm Ne. Thereafter, a similar operation to the aforementioned one at entrance into the lean-stoich. operation is carried out by means of the OR circuit 924, the AND circuit 922 and the flip flop circuit 941, depending upon the aforementioned engine water temperature condition.

What is claimed is:

1. In a fuel supply control system including fuel quantity adjusting means for controlling the quantity of fuel being supplied to an internal combustion engine having an intake pipe, wherein said fuel quantity adjusting means is electrically controlled in response to operating conditions of said engine to obtain a desired quantity of fuel being supplied to said engine, the combination comprising a sensor for detecting the rotational speed of said engine, a sensor for detecting absolute pressure in said intake pipe of said engine, said absolute pressure sensor being operable independently of changes in atmospheric pressure surrounding said engine, and means responsive to outputs of said sensors to cause leaning of an air/fuel mixture being supplied to said engine, said mixture leaning means being adapted to cause said fuel quantity adjusting means to lean said mixture when said engine is operating in a predetermined low load condition where the actual rotational speed of said engine detected by said engine rotational speed sensor is higher than a predetermined rotational speed which is higher than a possible upper limit of idling rpm and the actual absolute pressure in said intake pipe detected by said absolute pressure sensor is lower than a predetermined absolute pressure which cannot be assumed during rapid acceleration of said engine from an idle state thereof when the actual rotational speed of said engine is higher than said predetermined rotational speed.

2. In a fuel supply control system including fuel quantity adjusting means for controlling the quantity of fuel being supplied to an internal combustion engine having an intake pipe and an exhaust pipe, a sensor provided in said exhaust pipe for detecting the concentration of an exhaust gas ingredient, and feedback control means operatively connecting said concentration sensor to said fuel quantity adjusting means and operable in response to an output of said concentration sensor to electrically control said fuel quantity adjusting means so as to control the air/fuel ratio of an air/fuel mixture being supplied to said engine to a predetermined value, the combination comprising a sensor for detecting the rotational speed of said engine, a sensor for detecting absolute pressure in said intake pipe of said engine, said absolute pressure sensor being operable independently of changes in atmospheric pressure surrounding said engine, a sensor for detecting the temperature of said engine, and means responsive to outputs of said engine rotational speed sensor, said absolute pressure sensor and said engine temperature sensor to cause leaning of said air/fuel mixture, said mixture leaning means being adapted to cause said fuel quantity adjusting means to lean said air/fuel mixture when said engine is operating in a predetermined low load condition where the actual rotational speed of said engine detected by said engine rotational speed sensor is higher than a predetermined rotational speed which is higher than a possible upper limit of idling rpm, the actual absolute pressure in said intake pipe detected by said absolute pressure sensor is lower than a predetermined absolute pressure which cannot be assumed during rapid acceleration of said engine from an idle state thereof when the actual rotational speed of said engine is higher than said predetermined rotational speed, and the actual temperature of said engine detected by said engine temperature sensor is higher than a predetermined temperature.

3. In a fuel supply control system including fuel quantity adjusting means for controlling the quantity of fuel being supplied to an internal combustion engine having an intake pipe and an exhaust pipe, a sensor provided in said exhaust pipe for detecting the concentration of an exhaust gas ingredient, and feedback control means operatively connecting said concentration sensor to said fuel quantity adjusting means and operable in response to an output of said concentration sensor to electrically control said fuel quantity adjusting means so as to control the air/fuel ratio of an air/fuel mixture being supplied to said engine to a predetermined value, the combination comprising: a sensor for detecting the rotational speed of said engine; a sensor for detecting absolute pressure in said intake pipe of said engine, said absolute pressure sensor being operable independently of changes in atmospheric pressure surrounding said engine; means for detecting particular operating conditions of said engine; and means responsive to outputs of said engine rotational speed sensor and said absolute pressure sensor to cause leaning of said air/fuel mixture, said mixture leaning means being adapted to cause said fuel quantity adjusting means to lean said air/fuel mixture when said engine is operating in a predetermined low load condition where the actual rotational speed of said engine detected by said engine rotational speed sensor is higher than a predetermined rotational speed which is higher than a possible upper limit of idling rpm and the actual absolute pressure in said intake pipe detected by said absolute pressure sensor is lower than a predetermined absolute pressure which cannot be assumed during rapid acceleration of said engine from an idle state thereof when the actual rotational speed of said engine is higher than said predetermined rotational speed; said predetermined low load condition of said engine being one of said particular operating conditions of said engine; wherein said engine particular condition detecting means is operable upon detecting a particular condition of said engine to cause said feedback control means to interrupt feedback control of the air/fuel ratio of said air/fuel mixture.

4. A fuel supply control system comprising: fuel injection valve means adapted to control the quantity of fuel being supplied to an internal combustion engine having an intake pipe, through changes in an injection period thereof; a sensor for detecting the rotational speed of said engine; a sensor for detecting absolute pressure in said intake pipe, said absolute pressure sensor being operable independently of changes in atmospheric pressure surrounding said engine; means responsive to outputs of said engine rotational speed sensor and said absolute pressure sensor to determine a basic fuel injection period of said fuel injection valve means as a function of said outputs; and means responsive to said outputs of said engine rotational speed sensor and said absolute pressure sensor to cause leaning of an air/fuel mixture being supplied to said engine, said mixture leaning means being adapted to generate a correction coefficient for shortening said basic fuel injection period of said fuel injection valve means to thereby lean said air/fuel mixture when said engine is operating in a predetermined low load condition where the actual rotational speed of said engine detected by said engine rotational speed sensor is higher than a predetermined rotational speed which is higher than a possible upper limit of idling rpm and the actual absolute pressure in said intake pipe detected by said absolute pressure sensor is lower than a predetermined absolute pressure which cannot be assumed during rapid acceleration of said engine from an idle state thereof when the actual rotational speed of said engine is higher than said predetermined rotational speed.

5. A fuel supply control system comprising: fuel injection valve means adapted to control the quantity of fuel being supplied to an internal combustion engine having an intake pipe, through changes in an injection period thereof; a sensor for detecting the rotational speed of said engine; a sensor for detecting absolute pressure in said intake pipe, said absolute pressure sensor being operable independently of changes in atmospheric pressure surrounding said engine; a sensor for detecting the temperature of said engine; means responsive to outputs of said engine rotational speed sensor and said absolute pressure sensor to determine a basic fuel injection period of said fuel injection valve means as a function of said outputs; and means responsive to said outputs of said engine rotational speed sensor and said absolute pressure sensor and an output of said engine temperature sensor to cause leaning of an air/fuel mixture being supplied to said engine, said mixture leaning means being adapted to generate a correction coefficient for shortening said basic fuel injection period of said fuel injection valve means to thereby lean said air/fuel mixture when said engine is operating in a predetermined low load condition where the actual rotational speed of said engine detected by said engine rotational speed sensor is higher than a predetermined rotational speed which is higher than a possible upper limit of idling rpm, the actual absolute pressure in said intake pipe detected by said absolute pressure sensor is lower than a predetermined absolute pressure which cannot be assumed during rapid acceleration of said engine from an idle state thereof when the actual rotational speed of said engine is higher than said predetermined rotational speed, and the actual temperature of said engine detected by said engine temperature sensor is higher than a predetermined temperature.

6. In a fuel supply control system including fuel quantity adjusting means for controlling the quantity of fuel being supplied to an internal combustion engine having an intake pipe and an exhaust pipe, a sensor provided in said exhaust pipe for detecting the concentration of an exhaust gas ingredient, and feedback control means operatively connecting said concentration sensor to said fuel quantity adjusting means and operable in response to an output of said concentration sensor to electrically control said fuel quantity adjusting means so as to control the air/fuel ratio of an air/fuel mixture being supplied to said engine to a predetermined value, the combination comprising a sensor for detecting the rotational speed of said engine, a sensor for detecting absolute pressure in said intake pipe of said engine, said absolute presure sensor being operable independently of changes in atmospheric pressure surrounding said engine, and means responsive to outputs of said engine rotational speed sensor and said absolute presure sensor to cause leaning of said air/fuel mixture, said mixture leaning means being adapted to cause said fuel quantity adjusting means to lean said air/fuel mixture when said engine is operating in a predetermined low load condition where the actual rotational speed of said engine detected by said engine rotational speed sensor is higher than a predetermined rotational speed which is higher than a possible upper limit of idling rpm and the actual absolute pressure in said intake pipe detected by said absolute pressure sensor is lower than a predetermined absolute pressure which cannot be assumed during rapid acceleration of said engine from an idle state thereof when the actual rotational speed of said engine is higher than said predetermined rotational speed.

7. The fuel supply control system as claimed in claim 6, wherein said fuel quantity adjusting means comprises fuel injection valve means adapted to have an injection period thereof controlled by said feedback control means, said fuel injection valve means being operatively connected to said mixture leaning means and adapted to have an injection period thereof controlled to smaller values by said mixture leaning means when said engine is operating in said predetermined low load condition.

8. The fuel supply control system as claimed in claim 6, wherein said predetermined engine rotational speed and said predetermined absolute pressure are each set at different values between the time when said mixture leaning means initiates leaning said air/fuel mixture and the time when said mixture leaning means terminates said leaning of said mixture.

9. The fuel supply control system as claimed in claim 8, wherein said predetermined engine rotational speed is set at a higher value at initiation of said leaning of said air/fuel mixture than at termination of same.

10. The fuel supply control system as claimed in claim 8, wherein said predetermined absolute presure is set at a lower value at initiation of said leaning of said air/fuel mixture than at termination of same.

* * * * *